(12) United States Patent
Schneider et al.

(10) Patent No.: US 11,877,522 B2
(45) Date of Patent: Jan. 16, 2024

(54) DETERMINING CRITICAL TIMING PATHS IN A SUPERCONDUCTING CIRCUIT DESIGN

(71) Applicant: Microsoft Technology Licensing, LLC, Redmond, WA (US)

(72) Inventors: Janet L Schneider, Bellevue, WA (US); Paul Accisano, Seattle, WA (US); Mark G. Kupferschmidt, Bothell, WA (US); Kenneth Reneris, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 17/831,976

(22) Filed: Jun. 3, 2022

(65) Prior Publication Data

US 2022/0328748 A1  Oct. 13, 2022

Related U.S. Application Data

(63) Continuation of application No. 16/518,668, filed on Jul. 22, 2019, now Pat. No. 11,380,835.

(51) Int. Cl.
| | | |
|---|---|---|
| *H10N 60/12* | (2023.01) | |
| *G06F 30/394* | (2020.01) | |
| *G06N 10/20* | (2022.01) | |
| *H03K 3/38* | (2006.01) | |
| *H03K 19/195* | (2006.01) | |
| *H03K 19/20* | (2006.01) | |
| *H10N 60/80* | (2023.01) | |
| *G06F 119/12* | (2020.01) | |

(52) U.S. Cl.
CPC ........... *H10N 60/12* (2023.02); *G06F 30/394* (2020.01); *G06N 10/20* (2022.01); *H03K 3/38* (2013.01); *H03K 19/195* (2013.01); *H03K 19/20* (2013.01); *H10N 60/805* (2023.02); *G06F 2119/12* (2020.01)

(58) Field of Classification Search
CPC .... H10N 60/12; H10N 60/805; G06F 30/394; G06F 2119/12; G06F 30/3312; G06N 10/20; H03K 3/38; H03K 19/195; H03K 19/20; H03K 19/1952
See application file for complete search history.

(56) References Cited

U.S. PATENT DOCUMENTS

| | | | |
|---|---|---|---|
| 2016/0125102 A1* | 5/2016 | Shauck | G06F 30/394 716/103 |
| 2017/0117901 A1* | 4/2017 | Carmean | H03K 19/20 |
| 2018/0226975 A1* | 8/2018 | Braun | G06F 5/00 |

* cited by examiner

*Primary Examiner* — Sam K Ahn
*Assistant Examiner* — Amneet Singh
(74) *Attorney, Agent, or Firm* — Ranjeev Singh; Singh Law, PLLC

(57) ABSTRACT

Systems and methods for determining critical timing paths in a superconducting circuit design including Josephson junctions are provided. An example method includes providing timing information concerning a plurality of source terminals of at least one logic gate coupled with a first sink terminal of the at least one logic gate. The method further includes using a processor, determining whether, in view of the timing information, the first sink terminal is reachable by a single flux quantum (SFQ) pulse within a predetermined range of arrival time based on an assigned first phase to the at least one logic gate.

20 Claims, 16 Drawing Sheets

DETERMINING CRITICAL TIMING PATHS IN A SUPERCONDUCTING CIRCUIT DESIGN

CROSS-REFERENCE TO A RELATED APPLICATION

This application is a continuation of U.S. application Ser. No. 16/518,668, filed Jul. 22, 2019, titled "DETERMINING CRITICAL TIMING PATHS IN A SUPERCONDUCTING CIRCUIT DESIGN," the entire contents of which are hereby incorporated herein by reference.

BACKGROUND

Semiconductor based integrated circuits used in electronic devices, such as digital processors, include digital circuits based on complimentary metal-oxide semiconductor (CMOS) technology. CMOS technology, however, is reaching its limits in terms of the device size. In addition, power consumption at high clock speeds by digital circuits based on the CMOS technology has increasingly become a limiting factor in high performance digital circuits and systems. As an example, servers in a data center are increasingly consuming large amounts of power. The consumption of power is partly the result of power loss from the dissipation of energy even when the CMOS circuits are inactive. This is because even when such circuits are inactive, and are not consuming any dynamic power, they still consume power because of the need to maintain the state of CMOS transistors.

An additional approach to the use of processors and related components, based on CMOS technology, is the use of superconducting logic-based components and devices. Superconducting logic-based circuits can also be used to process quantum information, such as qubits. Many superconducting logic circuits include Josephson junctions, which may be controlled using high speed clocks or microwave signals. Such circuits can include active transmission elements that can complicate the creation of a correctly timed design.

SUMMARY

In one aspect, the present disclosure relates to a method, implemented by a processor, for determining a critical timing path in a superconducting circuit design, where the superconducting circuit design comprises at least one logic gate including at least one Josephson junction, and where the at least one logic gate has an assigned first phase associated with a clock signal for clocking the at least one logic gate. The method may include providing timing information concerning a plurality of source terminals of the at least one logic gate coupled with a first sink terminal of the at least one logic gate. The method may further include using the processor, determining whether, in view of the timing information, the first sink terminal is reachable by a single flux quantum (SFQ) pulse within a predetermined range of arrival time based on the assigned first phase to the at least one logic gate.

In another aspect, the present disclosure relates to a method, implemented by a processor, for determining a critical timing path in a superconducting circuit design, where the superconducting circuit design comprises a plurality of logic gates, and where each of the plurality of logic gates comprises at least one Josephson junction. The method may include providing timing information concerning a plurality of source terminals associated with the plurality of logic gates. The method may further include receiving a selection of a first sink terminal from among a plurality of sink terminals associated with a target logic gate selected from among the plurality of logic gates. The method may further include receiving an assignment of a phase to the target logic gate. The method may further include for each of the plurality of sink terminals: using the processor, determining whether each of the plurality of sink terminals is reachable by a respective single flux quantum (SFQ) pulse within a predetermined range of arrival time, and if the first sink terminal is not reachable within the predetermined range of arrival time, then inserting a Josephson transmission line (JTL) between a source terminal associated with the target logic gate and the first sink terminal determined to be unreachable within the predetermined range of arrival time, and upon determining that the first sink terminal is reachable, after an insertion of the JTL, within the predetermined range of arrival time, removing the first sink terminal from among the plurality of sink terminals as being associated with the critical timing path.

In yet another aspect, the present disclosure relates to a system configured to determine a critical timing path in a superconducting circuit design, where the superconducting circuit design comprises at least one logic gate including at least one Josephson junction, and where the at least one logic gate has an assigned first phase associated with a clock signal for clocking the at least one logic gate. The system may include a first sub-system configured to provide timing information concerning a plurality of source terminals of the at least one logic gate coupled with a first sink terminal of the at least one logic gate. The system may further include a second sub-system, including a processor, configured to determine whether, in view of the timing information, the first sink terminal is reachable by a single flux quantum (SFQ) pulse within a predetermined range of arrival time based on the assigned first phase to the at least one logic gate.

In another aspect, the present disclosure relates to a method, implemented by a processor, for determining timing paths and reconciling topology in a superconducting circuit design, where the superconducting circuit design comprises a first timing path including a first set of timing pins, and where a first subset of the first set of timing pins is associated with a first timing constraint group including a first timing endpoint and a second timing endpoint. The method may include using the processor, processing the first timing constraint group to assign a first legal start time to the first timing endpoint and a second legal start time to the second timing endpoint. The method may further include inserting a first shadow element representing a first physically connected component on the timing path, where the first shadow element precedes the first timing endpoint or follows the second timing endpoint. The method may further include addressing any changes to the first legal start time or the second legal start time caused by an insertion of the first shadow element on the timing path.

In yet another aspect, the present disclosure relates to a method, implemented by a processor, for determining timing paths and reconciling topology in a superconducting circuit design, where the superconducting circuit design comprises a first timing path including a first timing endpoint associated with a first circuit component and a second timing endpoint associated with a second circuit component, and where each of the first circuit component and the second circuit component comprises Josephson junctions, and where the first circuit component is assigned a first phase and the second circuit component is assigned a second phase. The method may include using the processor, determining a first legal start time for the first timing endpoint on the timing path and determining a second legal start time for the second timing endpoint on the timing path. The method may further include inserting a first shadow element representing a first physically connected component on the timing path, where the first shadow element precedes the first circuit component on the timing path. The method may further include inserting a second shadow element representing a second physically connected component on the timing path, where the second shadow element follows the second circuit component on the timing path. The method may further include addressing any changes to the first legal start time and the second legal start time caused by an insertion of the first shadow element and the second shadow element on the timing path.

In yet another aspect, the present disclosure relates to a system configured to determine timing paths and reconcile topology in a superconducting circuit design, where the superconducting circuit design comprises a first timing path including a first timing endpoint associated with a first circuit component and a second timing endpoint associated with a second circuit component, and where each of the first circuit component and the second circuit component comprises Josephson junctions, and where the first circuit component is assigned a first phase and the second circuit component is assigned a second phase. The system may include a processor and a memory comprising instructions. The instructions may be configured to: (1) determine a first legal start time for the first timing endpoint on the timing path and determine a second legal start time for the second timing endpoint on the timing path, (2) insert a first shadow element representing a first physically connected component on the timing path, where the first shadow element precedes the first circuit component on the timing path, (3) insert a second shadow element representing a second physically connected component on the timing path, where the second shadow element follows the second circuit component on the timing path, and (4) address any changes to the first legal start time and the second legal start time caused by an insertion of the first shadow element and the second shadow element on the timing path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated byway of example and is not limited by the accompanying figures, in which like references indicate similar elements. Elements in the figures are illustrated for simplicity and clarity and have not necessarily been drawn to scale.

DETAILED DESCRIPTION

Figure 1:
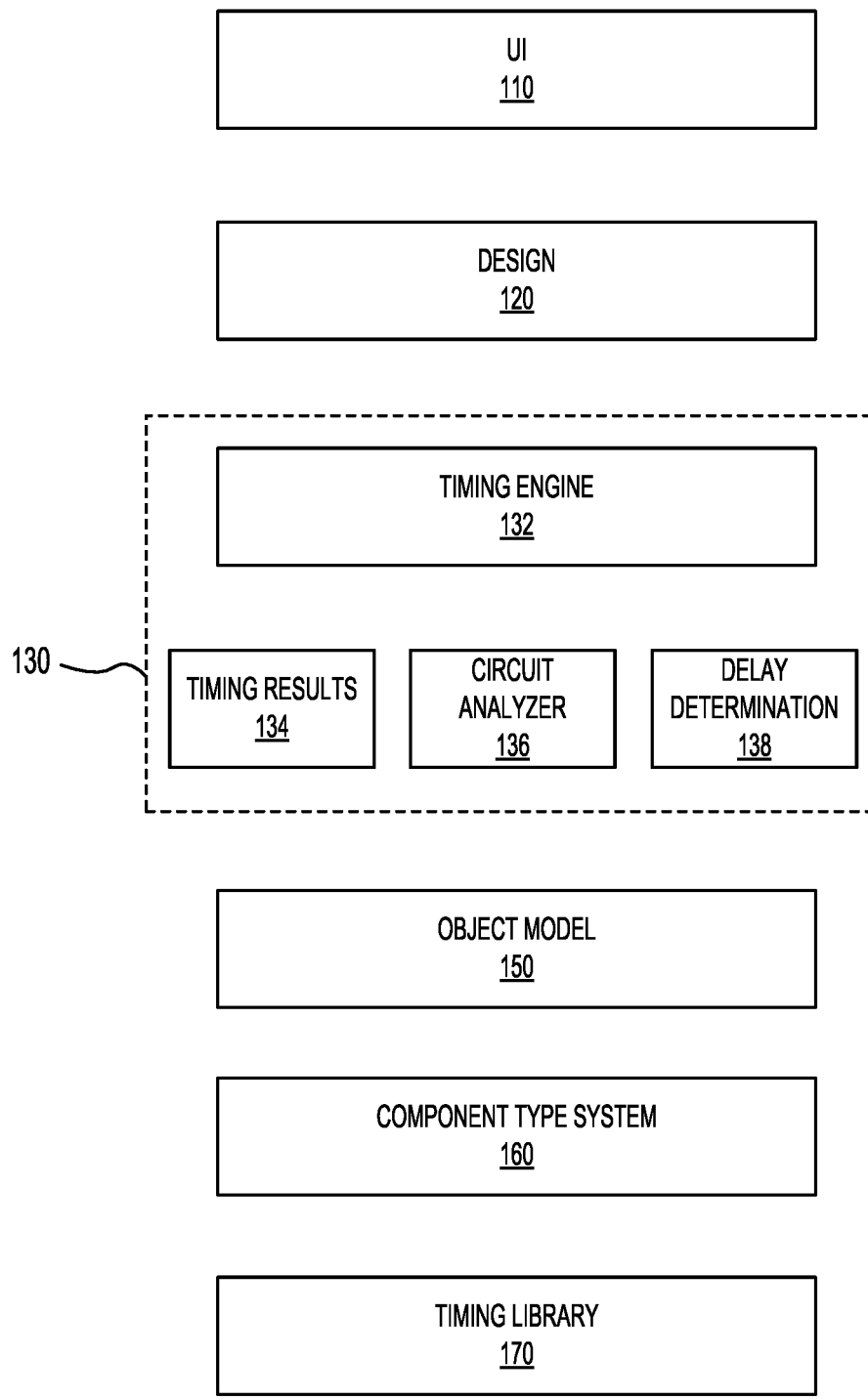
FIG. 1 is a block diagram of a system environment in accordance with one example.

Examples described in this disclosure relate to systems and methods for determining critical timing paths for a superconducting circuit design. Certain other examples relate to systems and methods for determining timing paths and reconciling topology in a superconducting circuit design. Superconducting circuits may use Josephson junctions to implement the functionality associated with the circuits. An exemplary Josephson junction may include two superconductors coupled via a region that impedes current. The region that impedes current may be a physical narrowing of the superconductor itself, a metal region, or a thin insulating barrier. As an example, the Superconductor-Insulator-Superconductor (SIS) type of Josephson junctions may be implemented as part of the superconducting circuits. As an example, superconductors are materials that can carry a direct electrical current (DC) in the absence of an electric field. Superconductors have a critical temperature (Tc) below which they have zero resistance. Niobium, one such superconductor, has a critical temperature (Tc) of 9.3 Kelvin degrees. At temperatures below Tc, niobium is superconductive; however, at temperatures above Tc, it behaves as a normal metal with electrical resistance. Thus, in the SIS type of Josephson junction superconductors may be niobium superconductors and insulators may be $Al_2O_3$ barriers. In SIS type of junctions, the superconducting electrons are described by a quantum mechanical wave-function. A changing phase difference in time of the phase of the superconducting electron wave-function between the two superconductors corresponds to a potential difference between the two superconductors.

Various superconducting circuits including transmission lines can be formed by coupling multiple Josephson junctions by inductors or other components, as needed. Microwave pulses can travel via these transmission lines under the control of at least one clock. The microwave pulses can be positive or negative, or a combination thereof. The microwave pulses may have a frequency of up to 10 GHz or higher. The clock may also have a frequency up to 10 GHz or higher.

In one example, the logic of the circuits may be referred to as wave pipelined logic and the digital data may be encoded using a pair of positive and negative SFQ pulses. As an example, a logical one bit may be encoded as a pair of SFQ pulses generated in the positive and negative phases of a sinusoidal clock. A logical zero bit may be encoded by the absence of positive/negative pulse pairs during a clock cycle. The positive SFQ pulse may arrive during the positive part of the clock, whereas the negative pulse may arrive during the negative part of the clock. The positive SFQ pulse may arrive before the positive part of the clock, but it will not be propagated until a positive clock arrives. Similarly, the negative SFQ pulse may arrive before the negative part of the clock, but it will not be propagated until a negative pulse arrives.

Certain examples further relate to the timing design of phase-mode logic based superconducting circuits. These superconducting circuits may also use phase-mode logic (PML) based devices. In the PML based devices, a logical '1' may be encoded as a phase high and a logical '0' may be encoded as phase low. The transitions between phase high and phase low may be event-triggered by single flux quantum (SFQ) pulses. In phase-mode logic based superconducting circuits, digital values may be encoded as Josephson junction (JJ) phase. A high phase may indicate a logic '1' and a low phase may indicate a logic '0.' Unlike the wave pipelined logic encoding, these values are persistent across clock cycles because there is no requirement for a negative pulse to reset the JJ phase. As an example, if an AC clock, with four phases, were used to power the phase-mode logic superconducting circuit, the output of the phase-mode logic circuit may be persistent across all four phases of the AC clock. In one example, a four-phase clock may be derived from two AC clock sources. The four phases of the clock may provide directionality to the single flux quantum (SFQ) pulses. Thus, as an example, with respect to a four-phase clock, the positive pulse may ride the leading edge of the clock from one phase to the next and arrive at the output after one cycle of delay and the negative pulse may follow with half a cycle of separation. Other types of clocking arrangements, including clocking with more than four phases may also be used.

The building blocks of superconducting circuits may include various types of logic gates. Example logic gates include an AND gate, an OR gate, a logical A-and-not-B (AanB) gate and a logical AND & OR (AndOr) gate. The AanB gate may have two inputs and one output (Q). An input pulse A may propagate to output Q unless an input pulse B comes first. The AndOr gate may have two inputs and two outputs (Q1 and Q2). The first input pulse, input pulse A or input pulse B goes to output Q1 and the second input pulse goes to output Q2. The logical behavior of these gates may be based on the reciprocal data encoding mentioned earlier or on the phase-mode logic based data encoding as mentioned earlier.

FIG. 1 is a block diagram of a system environment 100 in accordance with one example. System environment 100 shows example blocks for performing methods and systems related to timing determination and phase assignments for superconducting circuits. System environment 100 may include a user interface (UI) block 110, a design block 120, a timing and phase block (TPB) 130, an object model 150, a component type system 160, and a timing library 170. UI block 110 may include code for enabling a user interface that allows a designer or another user to interact with the system. As an example, UI block 110 may include code and data structures allowing a user: to determine critical paths in a superconducting circuit, to assign phase, and to modify the timing related design of the superconducting circuit. Design block 120 may comprise at least one object that may specify the design definitions related to the various parameters associated with the timing related design. As an example, design block 120 may be an object that specifies the frequency associated with the timing design. As another example, design block 120 may specify which timing library should be used with a superconducting circuit or a set of superconducting circuits relating to an integrated circuit.

With continued reference to FIG. 1, TPB 130 may include a timing engine 132, timing results 134, circuit analyzer 136, and delay determination 138. Timing engine 132 may calculate pulse propagation and timing constraints based on timing data. In this example, the output of timing engine 132 may be a set of minimum hold time and a maximum setup time for each arc between timing pins (also referred to as timing terminals) in each direction. This information may be stored as part of Timing Results 134. Circuit analyzer 136 may determine the topology of the circuit being timed and store that for processing by delay determination 138. Delay determination 138 may process the topology, including the gates in the timing path, to determine the delays between timing pins. The delays, so determined, may be stored in a look up table or another data structure. Timing engine 132 may look up individual delays between pins from the look up table or another data structure and sum the result. In addition, as described later, timing engine 132 may also provide additional information, including data related to critical timing paths, the topology, the paths with slack, and the number of Josephson transmission line (JTL) elements added. In this example, timing engine 132 may be implemented as a callable set of methods that allow timing related calculations and generation of output for use with the circuit design. High-level aspects of timing engine 132 may include the features shown in Table 1 below:

TABLE 1

| Name of the feature | Example description of the feature |
|---|---|
| Timing( ) | Calculates timing and inserts JTLs in the design to meet constraints. This alters the design. The optimization level can be specified as preliminary or full. |
| OutputReports( ) | Output data on the timing for a design. Exact parameters may change, but will include critical paths, slack time, reasons for JTL insertions. |

Still referring to FIG. 1, object model 150 may include data structures and code for supporting timing related definitions for abstracting the entities (e.g., logic gates or circuits) that need timing design. Table 2 below lists an example of the data structures and their example description.

TABLE 2

| Data structures | Description |
| --- | --- |
| TimingPinBase | TimingPin is a base object that may represent pins (e.g., terminals) for timing purposes, and has connections to next and previous pins |
| TimingPinSrc:TimingPinBase | Contains additional parameters for source pins |
| TimingPinSink:TimingPinBase | Specifies constraints for TimingPin endpoint pairs |
| TimingConstraintGroup | TimingConstraintGroups included in a set of connected TimingConstraints |
| TimingGraph | Points to a graph of connected TimingPins in a TimingConstraintGroup |
| TimingComponent and TimingShadows | Contains additional information concerning shadow components |

With continued reference to FIG. 1, Component Type System (CTS) 160 may be used to store data related to the relevant timing library (e.g., timing library 170). In this example, adding or changing data associated with the timing library will require one-time reinitialization of CTS 160. Timing library 170 may include information concerning frequency, AC amplitude, and other parameters concerning the type of logic gates that are associated with the design. As an example, the logic gates may correspond to wave pipelined logic gates or phase mode logic gates. In this example, timing library may include Json and Verilog definitions of the logic gates. These definitions may include rise/fall tables that coincide with clocks, and signal types (return to zero/non-return to zero, etc.). In one example, these definitions may be properties in the Verilog for gates. Although FIG. 1 shows certain blocks that are included as part of system environment 100, there may be additional or fewer blocks. As an example, system environment 100 may include a reports block that may be used to generate reports concerning the timing design. As another example, system environment 100 may include additional timing libraries that may include similar information that could be used to support superconducting circuits built for operation at different temperatures or superconducting circuits built using different manufacturing processes. Other timing libraries may be used for testing purposes only.

Figure 2:
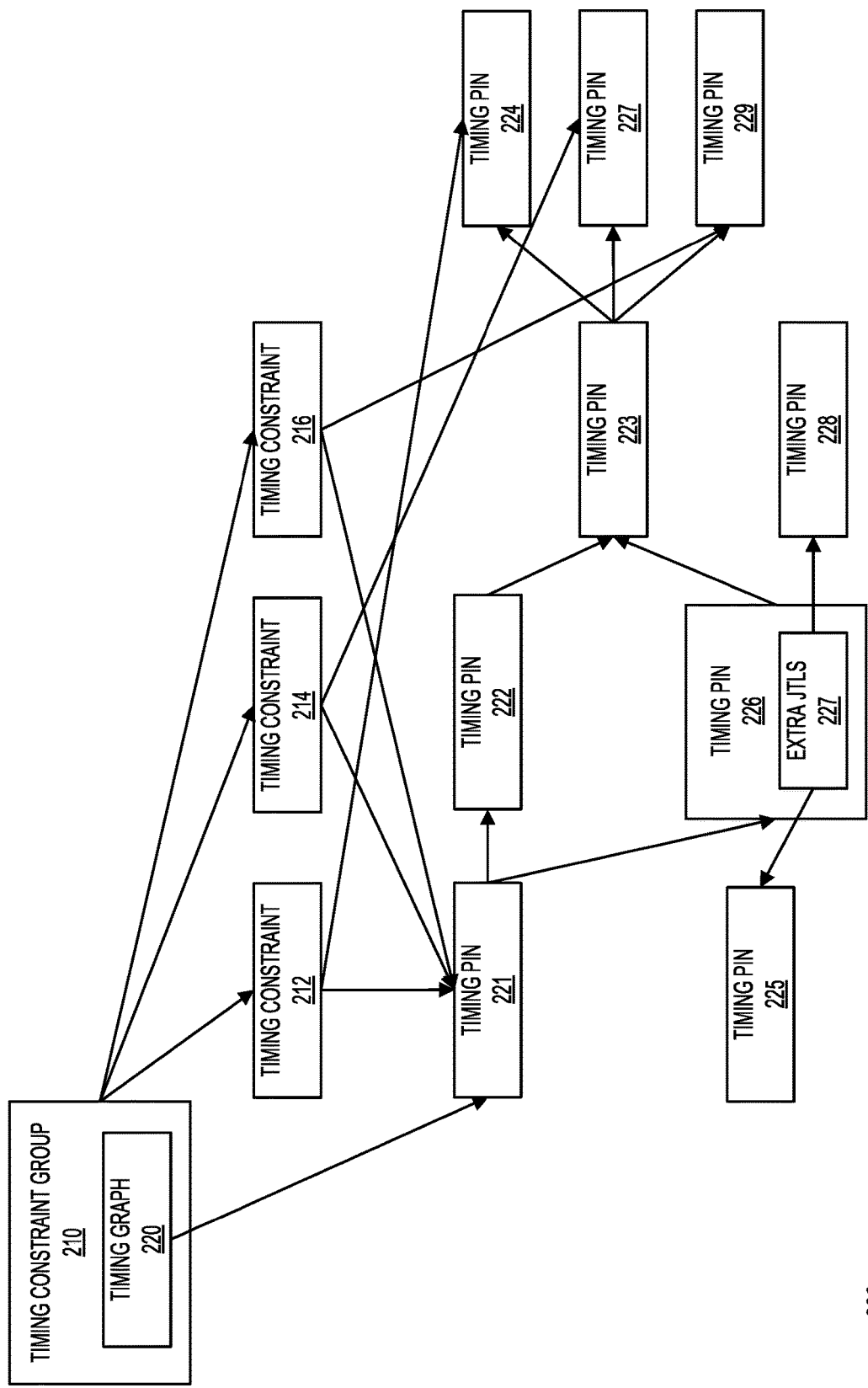
FIG. 2 is a block diagram of an object model in accordance with one example.

FIG. 2 shows a block diagram of an object model 200 in accordance with one example. Object model 200 is an example of object model 150 of FIG. 1. Object model 200 may include a timing graph 220. In this example of the object model, a timing graph (e.g., timing graph 220) is shown, but the timing components are not shown. Timing components and their relationship to object models is described with respect to FIG. 3. In one example, timing graph 220 may be implemented as a data structure shown in Table 3.

TABLE 3

| Name | Description |
| --- | --- |
| TPinConnection Roots[ ] | Points to the beginning timing pins within a TimingConstraintGroup. |

With continued reference to FIG. 2, TimingConstraintGroup 210 may include a set of connected Timing Constraints (e.g., Timing Constraint 212, Timing Constraint 214, and Timing Constraint 216). Example information encompassed by the data structure corresponding to TimingConstraint may include: BeginTimingPin, EndTimingPin, Hold, and Setup. Thus, in this example, the data structure may include information concerning the timing pin (e.g., a terminal associated with a logic gate) at which the timing constraint begins and the timing pin at which the timing constraint ends. The data structure may further include information concerning hold and setup times. Table 4 shows one example of the information included in a data structure for implementing TimingConstraintGroup 210.

TABLE 4

| Name | Description |
| --- | --- |
| TimingConstraints[ ] | Collection of all TimingConstraint objects |
| TimingGraph | Points to TimingGraph structure for TimingPins within the TimingConstraintGroup |
| AdditionalJTLCount | Overall additional JTL count for this TimingConstraintGroup |
| PhysicallyConnectedTimingConstraintGroups[ ] | Copies of all constraint groups with physical connects to the pins in this constraint group. |

Still referring to FIG. 2, as shown in Table 4, TimingConstraintGroup 210 may include a collection of timing constraints related information, including TimingConstraint 212, TimingConstraint 214, and TimingConstraint 216. Each of these may be implemented using a data structure and each may point to a timing pin related data structure to indicate that the timing constraint is related to that particular timing pin or that set of timing pins. Table 5 below shows an example set of information included in a data structure TimingConstraint.

TABLE 5

| [TimingConstraint]: | |
| --- | --- |
| Hold [2] | Min/max hold times in picoseconds (ps) |
| Setup [2] | Min/max setup times in ps |
| [Other Constraints] | Overall time (for determining critical path, slack time) |
| | Time (based on clock) |
| | Interjected clock data |
| | False paths |
| | Cycles |

Each timing pin (or timing terminal) may also have a corresponding data structure that may include information concerning items, such as ExtraJTLs and information concerning the type of the pin (or terminal) it is. As an example, each pin may be a source pin or a sink pin for a gate. Object model 200 shown in FIG. 2 includes timing pins: TimingPin 221, 222, 223, 224, 225, 226, 227, 228, and 229, each of which may have a corresponding data structure derived from a TimingPinBase data structure. In one example, a TimingPinBase data structure may include the information shown in Table 6 below.

TABLE 6

| Name | Description |
| --- | --- |
| PinConnection | ComponentId and PinTypeid pair |
| TimingPinType | TimingPinSrc or TimingPinSink |
| TPinConnection Next[ ] | Collection of all downstream connected pins |
| TPinConnection Prev[ ] | Collection of all upstream connected pins |
| Flags | IsAbstract, IsAbutted |
| Criticality | May be used as a hint later for building the N most critical paths. |

With continued reference to FIG. 2, Table 7 shows the information contained in a data structure corresponding to a source pin. In this example table, arc refers to the timing relationship between the input time and the output time for each pin.

TABLE 7

| Name | Description |
| --- | --- |
| Rise [2] | The minimum and maximum rise times and the corresponding peak voltages for all arcs, in ps. |
| Fall [2] | The minimum and maximum fall times and the corresponding peak voltages for all arcs, in ps. |
| Phase | Assigned A/C clock phase |
| Read-only | Flag to indicate if the times and clock cycle are fixed and cannot be changed. |

Table 8, shown above, is an example of the information contained in a data structure corresponding to a sink pin.

TABLE 8

| Name | Description |
| --- | --- |
| ExtraJTLs | Ordered list of TimingPinSink and TimingPinSource pairs that have PinTypeIds but do not have ComponentIds. This allows one to add specific JTLs in front of sink pins. These could be buffers, delays, cycle changes, etc. |
| Count | Number of JTLs |

Figure 3:
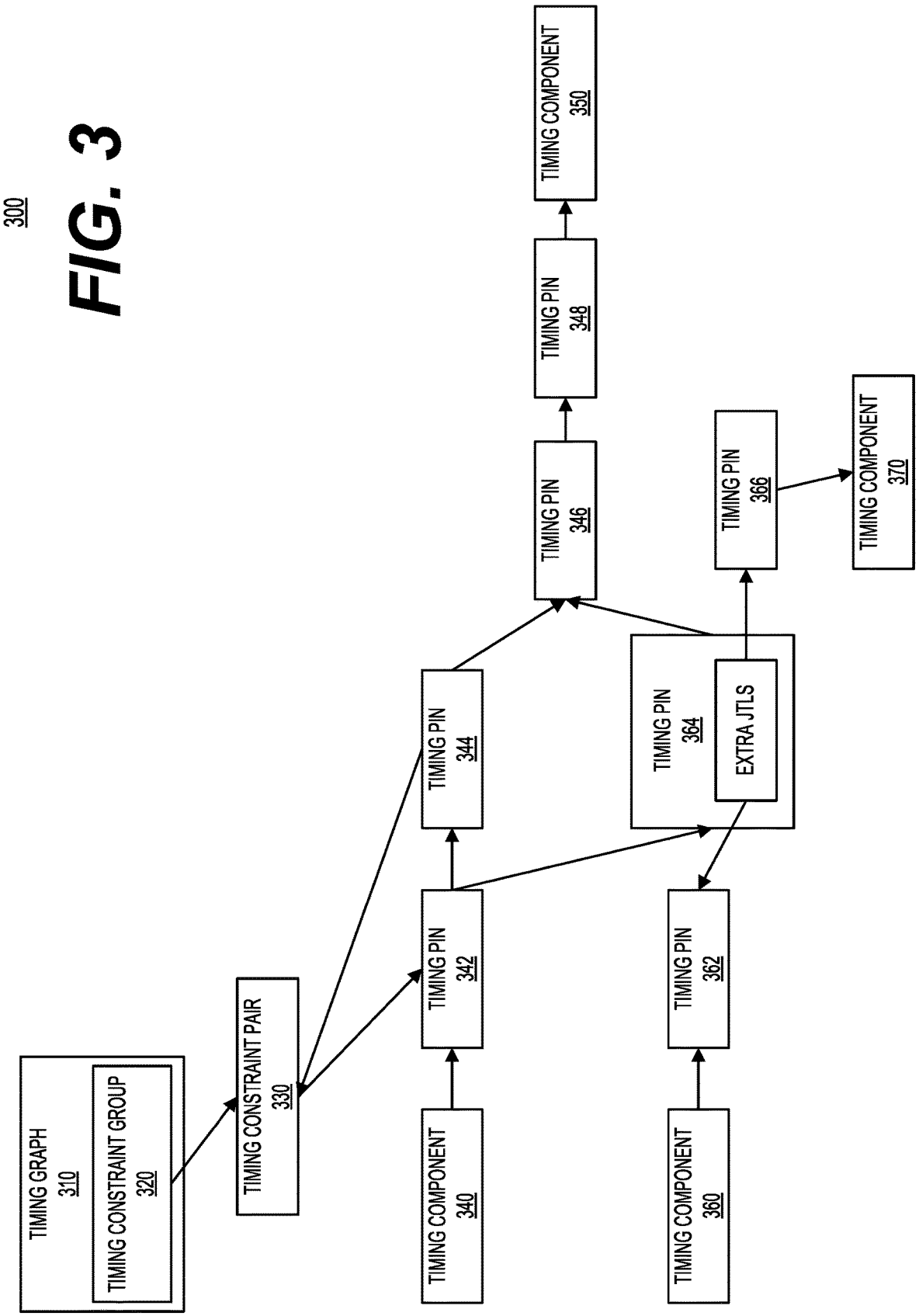
FIG. 3 shows a diagram including timing components and their relationship to object models in accordance with one example.

FIG. 3 shows a block diagram of another timing object model 300 in accordance with another example. Object model 300 is an example of object model 150 of FIG. 1. In this example, both the timing graph and the timing components are shown. In this example, similar data structures as described earlier with respect to FIG. 2 are used to model pins and timing constraints associated with the object model corresponding to a design of a circuit including active transmission elements, such as JTLs. Thus, TimingGraph 310 may be implemented in a similar manner and with similar information as described earlier with respect to Table 3. Similarly, TimingConstraintGroup 320 may be implemented with similar information as described earlier with respect to Table 4. In this example, TimingConstraintGroup 320 may point to a TimingConstraintPair 330. In one example, the information included in a data structure corresponding to TimingConstraintPair 330 is shown in Table 9 below.

TABLE 9

| Name | Description |
| --- | --- |
| BeginTimingPin | Start pin. Must be a source pin, must have 0 Prev[ ] |
| EndTimingPin | End pin. Must be a sink pin, must have 0 Next[ ] |
| | TimingConstraint: |
| Hold [2] | Min/max hold times in ps |
| Setup [2] | Min/max setup times in ps |

TABLE 9-continued

| Name | Description |
| --- | --- |
| CycleCount | Must have this number of cycle counts in the begin/end pair |

With continued reference to FIG. 3, object model 300 may include timing components, including: Timing Components 340, 350, 360, and 370 may represent components to be timed, and may be used to find related timing constraint groups in the reconcile step for physically connected components in different timing graphs. Graphs are built with timing components for all physically connected components on a timing path. A map for each graph may contain all timing components that are owned by that graph. All components on the timing paths except the HEADS are owned by its timing graph. HEADS are owned by the timing graph for its predecessor. Object model 300 shown in FIG. 3 includes timing pins: TimingPin 342, 344, 346, 348, 362, 366, and 368, each of which may have a corresponding data structure derived from a TimingPinBase, which is described with respect to Table 6 earlier.

Figure 4:
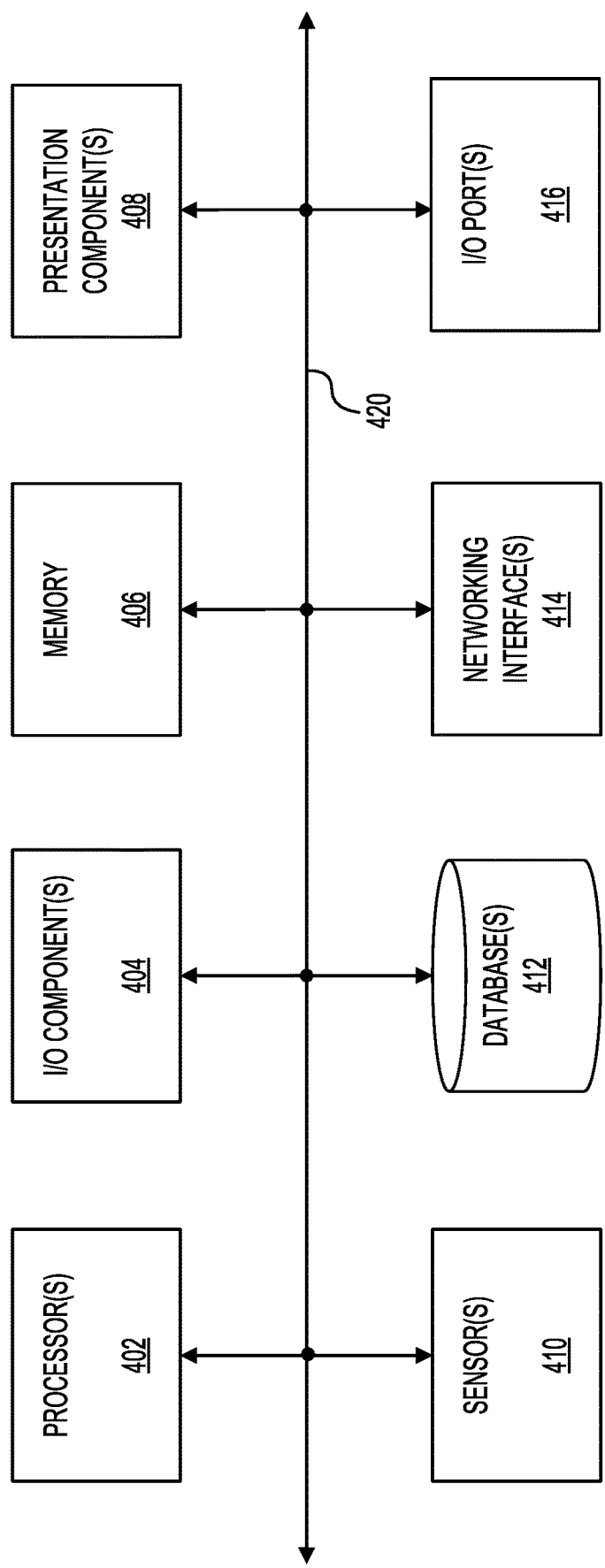
FIG. 4 shows a computing platform that may be used to implement the functions associated with the system environment of FIG. 1 in accordance with one example.

FIG. 4 shows a computing platform 400 that may be used to implement the functions associated with system environment 100 of FIG. 1. Computing platform 400 may include processor(s) 402, I/O component(s) 404, memory 406, presentation component(s) 408, sensor(s) 410, database(s) 412, networking interface(s) 414, and I/O port(s) 416, which may be interconnected via bus 420. Processor(s) 402 may execute instructions or code stored in memory 406. The instructions may correspond to the various algorithms described in the present disclosure. Thus, the algorithms may be implemented using a programming language and compiled into executables, which may then be executed. I/O component(s) 404 may include components such as a keyboard, a mouse, a voice recognition processor, or touch screens. Memory 406 may be any combination of non-volatile storage or volatile storage (e.g., flash memory, DRAM, SRAM, or other types of memories). Presentation component(s) 408 may be any type of display, such as LCD, LED, or other types of display, or other types of output components, including audio or haptic output components. Sensor(s) 410 may include audio sensors, optical sensors, or other types of sensors.

With continued reference to FIG. 4, database(s) 412 may be used to store the timing library and other timing related information. In addition, database(s) 412 may also store data used for generating reports related to the timing library. Networking interface(s) 414 may include communication interfaces, such as Ethernet, cellular radio, Bluetooth radio, UWB radio, or other types of wireless or wired communication interfaces. I/O port(s) 416 may allow computing platform 400 to communicate with bus 420 or other I/O component(s) 404. Although FIG. 4 shows computing platform 400 as including a certain number of components arranged and coupled in a certain way, it may include fewer or additional components arranged and coupled differently. In addition, the functionality associated with computing platform 400 may be distributed or combined, as needed. Moreover, not all of the aspects of computing platform 400 may be needed to implement the various methods described herein.

Figure 5:
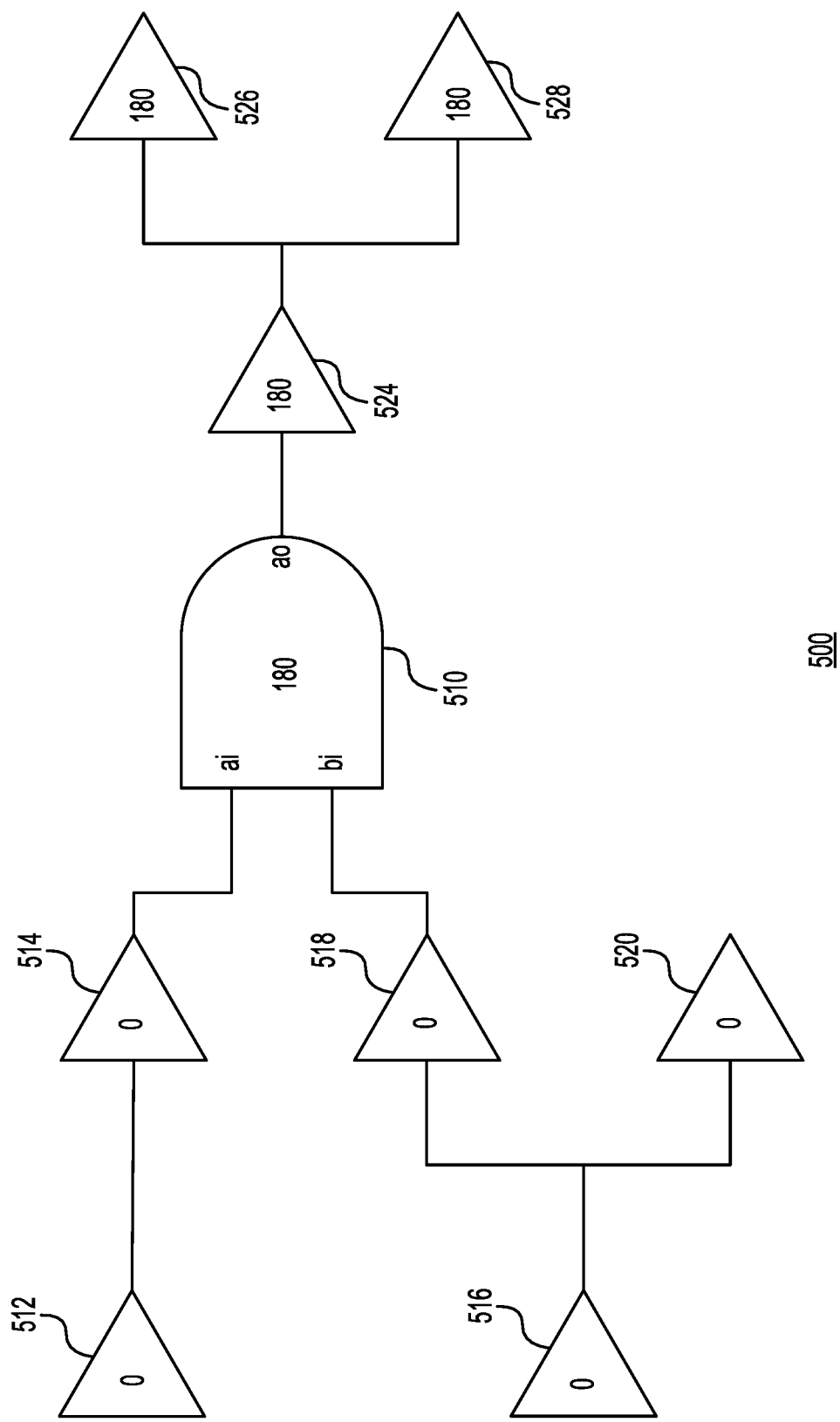
FIG. 5 shows a schematic diagram of an example logic circuit that is being timed in accordance with one example.

FIG. 5 shows a schematic diagram of an example logic circuit 500 that is being timed in accordance with one example. Example logic circuit 500 may include an AND gate 510 and several JTLs. AND gate 510 may include two input terminals: ai and bi, and an output terminal: ao. JTL 512 and 514 may be coupled to the input terminal ai, as shown in FIG. 5. JTLs 516 and 518 may be coupled to the input terminal bi, as shown in FIG. 5. JTL 520 may be coupled to the output JTL 516. Although not shown in this figure, JTL 520 may be used to couple logic circuit 500 to other logic circuit(s). JTL 524 may be coupled to the output terminal ao, as shown in FIG. 5. Additional JTLs, as needed, may be coupled; for example, JTL 526 and JTL 528 may be coupled to JTL 524. JTL 526 and JTL 528 may be used to couple logic circuit 500 to other logic circuit(s). As shown in FIG. 5, each JTL and logic gate included in logic circuit 500 may have an initial phase assignment. This example circuit is assumed to operate with a four phase clock, such that the phase assignments include 0 degrees, 90 degrees, 180 degrees, and 270 degrees. Logic circuits that are driven by a clock that includes fewer or more phases may also be designed. Single-flux quantum pulses may arrive at the input terminals of AND gate 510 via JTLs coupled to the respective input terminal. After processing by AND gate 510, SFQ pulses representing a logical AND value may be output via the output terminal. To ensure proper operation of logic circuit 500, instructions corresponding to an algorithm stored in memory 406, when executed by processor(s) 402, may help a designer design the timing aspects and the phase assignment aspects of logic circuit 510. An example algorithm is shown in Table 10 below.

by 90 degrees), then the phases assigned to the downstream gates and JTLs are invalidated.

With continued reference to table 10, in step 3, a target time, for the chosen phase assignment, of T may be assigned to the logic gate. In step 4, for each sink pin, the algorithm may determine whether the sink pin is reachable by time T starting with no JTLs inserted in the path. If the sink pin is not reachable, then extra JTLs may be inserted. Thus, if logic gate 510 is initially assigned a phase of 90 degrees and if the input terminal ai of logic gate 510 (one of the sink pins of the gate) is not reachable within the time T (i.e., MRT is greater than T), then extra JTLs may be inserted. As an example, an additional buffer (e.g., JTL 514) may be inserted in the path leading up to one of the sink pins. The delay associated with the buffer sequence with the addition of the JTL may be looked up in the look up table. If MRT is still greater than T, then the sink pin is still not reachable by time T. Phases may be assigned to each buffer (e.g., each JTL), starting with the phase of the source pin, for the logic gate. As an example, if the phase assignment of 0 degrees for the logic gate did not work, then it may be assigned a phase of 90 degrees.

Continuing with the description of the algorithm in Table 10, using Create ComponentGraph method, a component graph may be created for the logic circuit being designed. As

TABLE 10

Let G = the target gate, C = all sink pins of G
1. Find sink pin in C with minimum MRT (max rise time). Let P = phase of this gate.
2. Assign gate phase to be P+ (As needed, change to P+ to accommodate phase/timing issues (as an example, while gate phase P may work for one sink pin of the gate, it may not work for the other sink pin))
3. Let T = target time for that phase.
4. For each sink pin in C, in order of maximum rise time (MRT):
    Check if the sink pin is reachable by T. For N = 0 to inf:
      Set extra JTLs to N buffers
      Look up delay on each buffer sequence
        If MRT > T, the sink pin is not reachable by T.
        Break.
      Assign phases to each buffer, starting with phase of the source pin
      Create ComponentGraph and call RunLengthChecker.
        If WithinReach, the sink pin is reachable by T.
      Break.
    If the sink pin is reachable, remove it from C.
5. If C is empty, the critical path is the last sink pin to have been removed from C.
6. Otherwise, go to step 2.

The steps shown in Table 10 may be executed for each logic gate (e.g., logic gate 510 of logic circuit 500) that is included in the design. The steps shown in Table 10 relate to any gate G that includes a C number of sink pins. The first step may include finding the sink pin from among the set of the C sink pins that has the maximum rise time (MRT) for any arriving SFQ pulses. In one example, the MRT may be determined by the processor executing the steps looking up a table with the MRT values stored therein. In step 2 of Table 10, the phase associated with the gate may be changed to P+, as needed. As an example, while the assignment of phase 0 may work for one sink pin of the gate, it might not work for the other sink pin. In that case, the phase assigned to the gate may be increased by 90 degrees (assuming the logic circuit that is being designed is being clocked by a four phase AC clock in which the next phase assignment is 90 degrees). In case the phase assigned to the gate is changed (e.g., increase an example, a component graph may be created for logic circuit 500. Next, the algorithm may include calling the RunLengthChecker method, which may create different reports based on the JTLs added for timing. Next, the algorithm may include calling the WithinReach method to determine if the sink pin is reachable by the target time T. If the sink pin is reachable, then it may be removed from the C number of gates. If C is empty and all of the sink pins associated with the logic gate G have been processed, then in step 5, the critical path is identified as the last sink pin to have been removed from C. If C is not empty, then, as part of step 6 (in this example), the processing of the algorithm returns to step 2. After the critical path is determined, the logic gates and JTLs need phase assignment. An example algorithm for phase assignment is described with respect to Table 11.

TABLE 11

1. Find critical path for the gate being processed using the algorithm, described with respect to Table 10, if not already done so
2. Assign phase based on the critical path determined in step 1
    a. Call method ArePinRelativePhasesValid to determine the validity of the set of the phase assignments.
3. Add Extra JTLs with assigned phases in order to close on constraints on the critical pin. This may change the primary phase assignment of the gate if a phase change is needed or desirable.
    a. Failures here include failing to route or failure to add another needed JTL in order to meet the time.
4. Add Extra JTLs with assigned phases to close on non-critical pins As shown in Table 11, the first step requires determining the critical path with respect to the gate being processed, unless it is already determined. Next, in step 2, phases may be assigned to the various JTLs and the gate based on the critical path. As an example, as described earlier with respect to Table 10, the phase assignments may be changed during the determination of the critical path. Using these phase assignments, in step 3, a method referred to as ArePinRelativePhasesValid is called to determine whether the phase assignments are valid. This method may take into account the logic of the superconducting circuits, including taking into account whether the logic is wave pipelined logic or phase-mode logic.

Still referring to Table 11, the next step involves adding extra JTLs with the assigned phases to close on constraints on the critical pin. This may change the primary phase assignment of the gate if a phase change is needed or desirable. Failures here include failing to route or failure to add another needed JTL in order to meet the time. Another failure may relate to the timing exceeding the range of the legal arrival time (e.g., as a result of the addition of JTLs for covering distance). The next step includes adding extra JTLs with the assigned phases to close on the non-critical pins. As an example, with respect to logic circuit 500, if sink pin corresponding to the input ai is determined to be the critical path, then this step includes adding extra JTLs as needed to ensure the timing is correct with respect to the sink pin corresponding to the input bi of AND gate 510.

Figure 6:
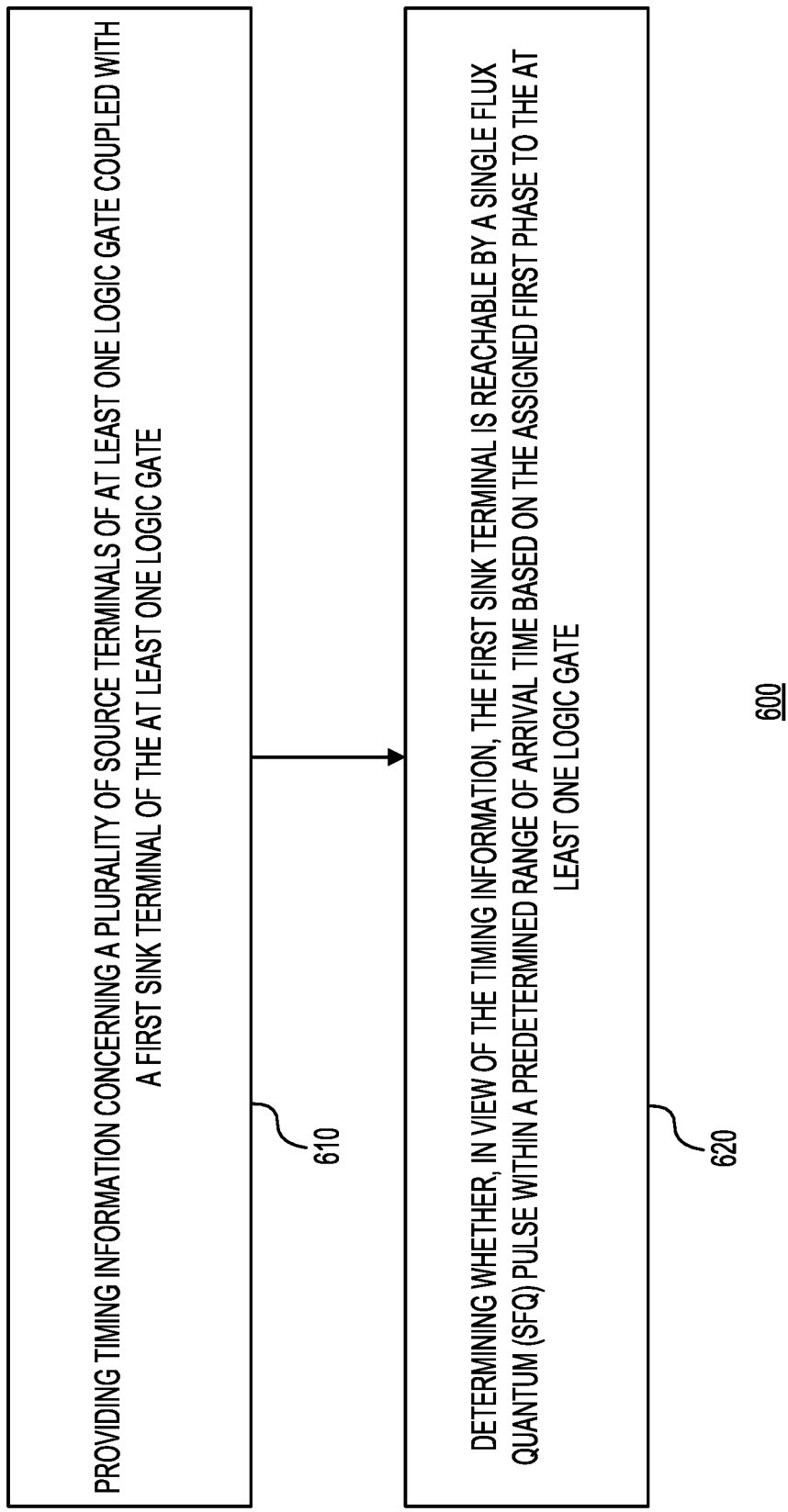
FIG. 6 is a flow chart 600 of a method for determining the validity of a timing path in a superconducting circuit design in accordance with one example.

FIG. 6 is a flow chart 600 of a method for determining the validity of a timing path in a superconducting circuit design in accordance with one example. In this example, the various steps recited as part of flow chart 600 may be performed by timing engine 132 of FIG. 1. Step 610 may include providing timing information concerning a plurality of source terminals of at least one logic gate coupled with a first sink terminal of the at least one logic gate. In one example, this information may be provided via timing library 170 of FIG. 1.

Step 620 may include determining whether, in view of the timing information, the first sink terminal is reachable by a single flux quantum (SFQ) pulse within a predetermined range of arrival time based on the assigned first phase to the at least one logic gate. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). Timing engine 132 may access timing library 170 when it is loaded into a memory (e.g., memory 406 of FIG. 4). As an example, timing engine 132 may execute step 4 of the steps shown in Table 10 to determine whether, in view of the timing information, the first sink terminal is reachable by a single flux quantum (SFQ) pulse within a predetermined range of arrival time based on the assigned first phase to the at least one logic gate. Although FIG. 6 shows certain number of steps being performed in a certain order, method 600 may include more or fewer steps performed in a different order.

Figure 7:
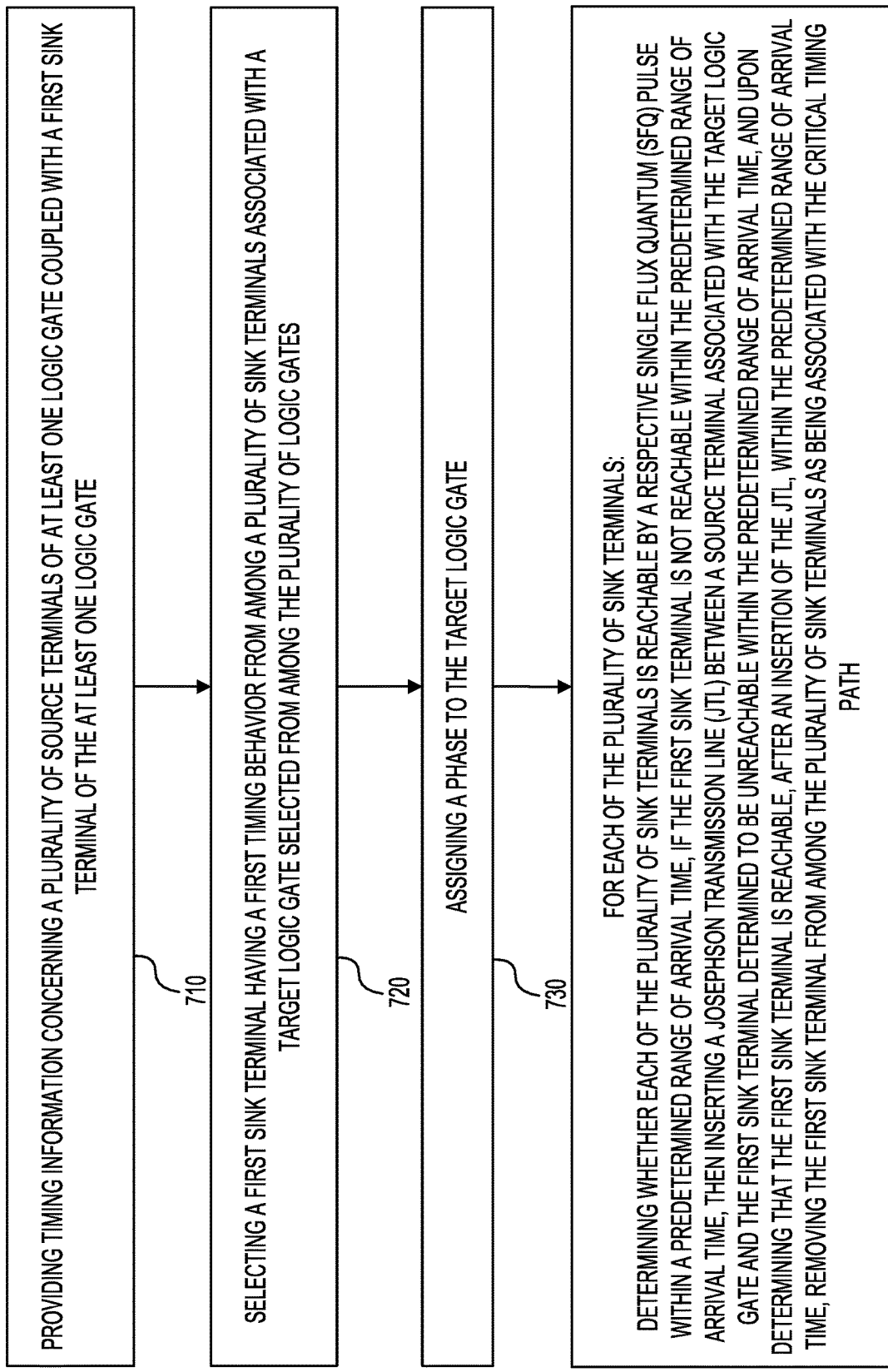
FIG. 7 is a flow chart 700 of a method for determining a critical timing path and for solving the critical timing path in a superconducting circuit design in accordance with another example.

FIG. 7 is a flow chart 700 of a method for determining a critical timing path and for solving the critical timing path in a superconducting circuit design in accordance with another example. In this example, the various steps recited as part of flow chart 700 may be performed by timing engine 132 of FIG. 1. Step 710 may include providing timing information concerning a plurality of source terminals associated with the plurality of logic gates. In one example, this information may be provided to timing engine 132 via timing library 170 associated with system 100 of FIG. 1.

Step 720 may include receiving a selection of a first sink terminal from among a plurality of sink terminals associated with a target logic gate selected from among the plurality of logic gates. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform step 1 shown in Table 10. Thus, as an example, timing engine 132 may find the sink pin in the set of C sink pins with the minimum max rise time (MRT). In one example, timing engine 132 may find the sink pin by looking up a lookup table (which may be stored in memory 406 of FIG. 4).

Step 730 may include receiving an assignment of a phase to the target logic gate. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform step 1 shown in Table 10. Thus, as an example, timing engine 132 may assign an initial phase to the target logic gate. As an example, with respect to logic circuit 500, logic gate 510 is initially assigned a phase of 180 degrees. This phase assignment may be subject to change based on topological changes to the design of logic circuit 500.

Step 740 may include for each of the plurality of sink terminals: (1) determining whether each of the plurality of sink terminals is reachable by a respective single flux quantum (SFQ) pulse within a predetermined range of arrival time, and (2) if the first sink terminal is not reachable within the predetermined range of arrival time, then inserting a Josephson transmission line (JTL) between a source terminal associated with the target logic gate and the first sink terminal determined to be unreachable within the predetermined range of arrival time, and upon determining that the first sink terminal is reachable, after an insertion of the JTL, within the predetermined range of arrival time, removing the first sink terminal from among the plurality of sink terminals as being associated with the critical timing path. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform step 4 shown in Table 10. Although FIG. 7 shows a certain number of steps being performed in a certain order, the method may include more or fewer steps performed in a different order.

To break up the TimingPins into sets of runs that can be processed asynchronously, TimingConstraintGroups may be formed from sets of connected TimingConstraints. There can be multiple TimingConstraintGroups for a design. There may be one large TimingConstraintGroup for each design, and a few smaller TimingConstraintGroups. As explained earlier with respect to FIG. 2 and Tables 4 and 5, a TimingConstraintGroup 210 may include a collection of timing constraints related information, including Timing-Constraint 212, TimingConstraint 214, and TimingConstraint 216. Each of these may be implemented using a data structure and each may point to a timing pin related data structure to indicate that the timing constraint is related to the that particular timing pin or that set of timing pins. A TimingGraph may point to a graph of TimingPins within a TimingConstraintGroup.

A TimingGraph may be built with timing components for all physically connected components on a timing path. There is a map for each graph that contains all timing components that are owned by that graph. All components on the timing paths except the heads are owned by its timing graph. Heads are owned by the timing graph for its predecessor. Table 12 provides an example of an algorithm for solving and reconciling constraint groups.

TABLE 12

1. Determine critical path for a set of timing endpoints and assign phase for the set of timing endpoints for all constraint groups that are being analyzed
2. Reconcile for all TimingComponents-the winner is the value in the TimingConstraintGroup (TCG) that "owns" the pin for timing. For all timing components and tails in the paths, it is their TimingConstraintGroup. For the heads, it is the TimingConstraintGroup of the TiminaComponent when it is a tail.
   Phases- Reconcile within the TCG and reconcile across design
   ExtraJTfs-the sink pin as it was solved in a timing path
   TimingInfo-the value of the source pin as it was solved for the timing path. (The algorithm will choose the values set on the timing component in the graph that "owns" it).
3. Were there any changes during Reconcile?
   Yes-run Solve with phase legalization set to true. Go to step 2
   No-run Solve with phase legalization set to false.

Step 1 includes determining critical paths and assigning phase for a set of timing endpoints associated with all constraint groups that are being analyzed (e.g., timing constraint groups that may be part of a timing path). In this example, timing endpoints are pins that define separate timing "runs" that can be timed and validated independently according to their timing and phase constraints. They are defined by the designer of the circuit and are explicit components in the circuit design. Different types of timing endpoints may be specified depending on whether the logic associated with the circuit is implemented using phase-mode logic or wave pipelined logic. For the wave pipelined logic circuits or the phase-mode logic circuits, the presence or the absence of the arcs in the library data will indicate whether a timing pin is a begin timing endpoint or an end timing endpoint. In this example, the set of timing endpoints includes the timing endpoints associated with the timing pins that are part of the same timing constraint group. As an example, timing pins associated with logic circuit 500 may be part of the same timing constraint group. The set of timing endpoints may further include timing endpoints associated with timing constraint groups that are within a certain number of hops. In one example, these groups may include groups that are two hops backward and one hop forward, or two hops forward and one hop backward. To analyze these timing pins, "shadow" elements may be created representing physically connected elements on a timing path.

Still referring to Table 12, step 2 may include reconciling for all TimingComponents. The winner of the reconciling step is the value in the TimingConstraintGroup that "owns" the pin for timing. For all timing components and tails in the paths, it is their TimingConstraintGroup. For heads, it is the TimingConstraintGroup of the TimingComponent when it is a tail. Thus, in sum, this step may include reconciling differences in the arrival times and the signal propagation elements (e.g., insertion of JTLs), using a gate's timing path to set values for the other timing paths that are physically connected to that gate.

With continued reference to Table 12, step 3 includes determining whether there were any changes in respect to timing and phase assignments. If there were changes then the processing of the algorithm returns to step 3. If there were no changes then the processing includes solving the timing constraint groups to ensure that the timing information and the phase assignments for the extra components (e.g., extra JTLs) that are in the timing constraint groups is accurate. Thus, using the algorithm described in Table 12, one can iterate towards a convergent solution where the iterations lead to the timing and the phase assignments being fixed and no longer requiring changes. An application of the algorithm described with respect to Table 12 is provided with respect to an example circuit as part of FIGS. 8-13.

Figure 8:
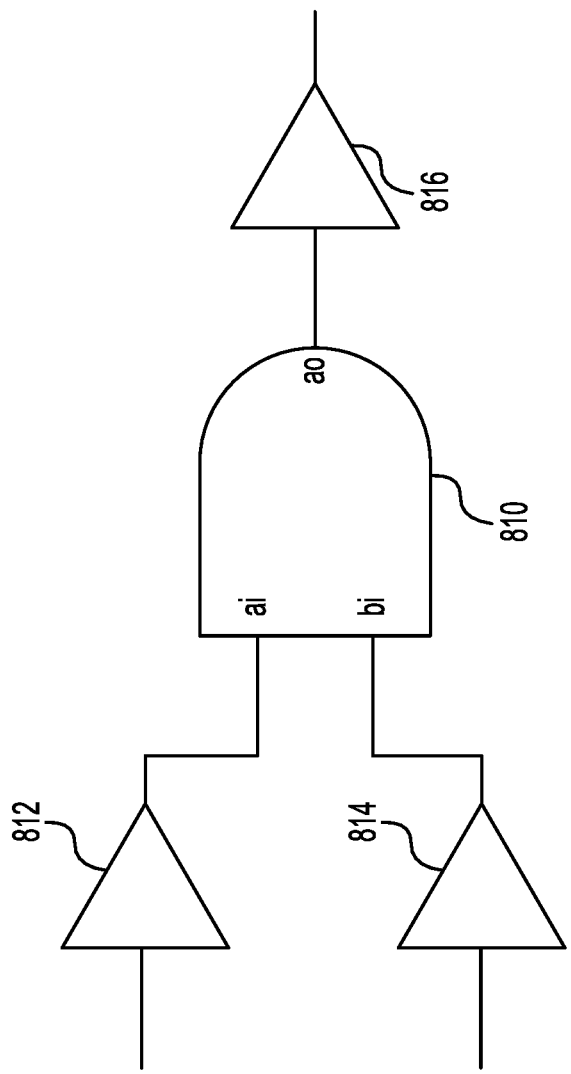
FIG. 8 shows a diagram of a circuit that represents an example of a timing constraint group (TCG) that includes the timing pins that are part of the constraint group.

FIG. 8 shows a diagram of a circuit that represents an example timing constraint group (TCG) 800 that includes the timing pins that are part of the constraint group, which may be processed using the solve and reconcile algorithm descried with respect to Table 12. TCG 800 may include buffers 812, 814, and 816, which may be coupled to the input terminals and the output terminal of gate 810 as shown in FIG. 8. From a timing analysis point of view, TCG 800 includes three timing endpoints. The first two timing endpoints correspond to inputs to buffers 812 and 814 and the third timing endpoint corresponds to the output of buffer 816. A TimingConstraintGroup data structure may be used to represent the relevant details for the timing analysis of TCG 800. The solve and reconcile algorithm may process the timing design in view of the timing constraints imposed by other circuits in the design. In one example, as part of this analysis, components (referred to as shadow components) that are within a depth of three timing endpoints may be included. In addition, as part of this analysis, real components that are within the depth of three timing endpoints may also be included. This is because the timing may change not only as a result of the changes to the shadow components but also as a result of the changes to the real components.

Figure 9:
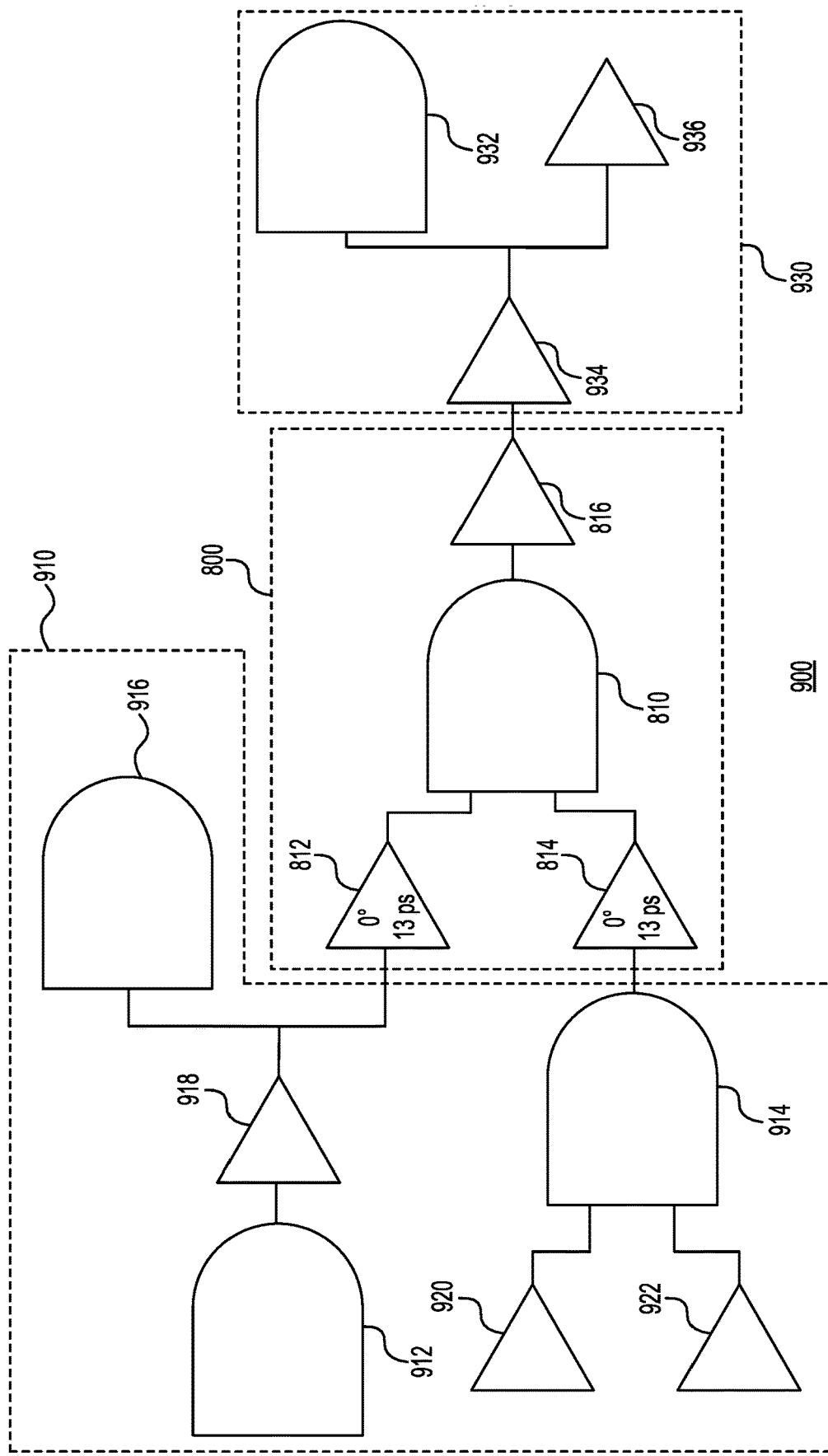
FIG. 9 shows a diagram including shadow components corresponding to timing constraint groups (TCGs) that precede or follow the TCG of FIG. 8 as part of the superconducting circuit design in accordance with one example.

FIG. 9 shows a diagram 900 including shadow components corresponding to timing constraint groups (TCGs) that precede or follow TCG 800 as part of the superconducting circuit design. These shadow components are part of other timing constraints groups and are not being timed, other than the fact that they need to be considered to solve and reconcile TCG 800. In this example, two timing endpoints going backward and one timing endpoint going forward is included as part of the analysis. In this example, TCG 910 may include buffers 918, 920, and 922, which are coupled and arranged as shown in FIG. 9. TCG 910 may further include logic gates 912, 914, and 916, which are coupled and arranged as shown in FIG. 9. TCG 930 may include buffers 934 and 936 and gate 932, which may be coupled and arranged as shown in FIG. 9. FIG. 9 further shows the initial phase assignment to buffers 812 and 814 associated with the two timing endpoints. In this example, the phase assignment is 0 for both buffers 812 and 814. The first legal start time for the 0 degrees phase assignment for these two timing endpoints is determined to be 13 picoseconds (ps), as labeled in FIG. 9. In this example, the legal start time is determined based on the timing constraints identified based on hardware analysis of the implemented buffers and gates.

Figure 10:
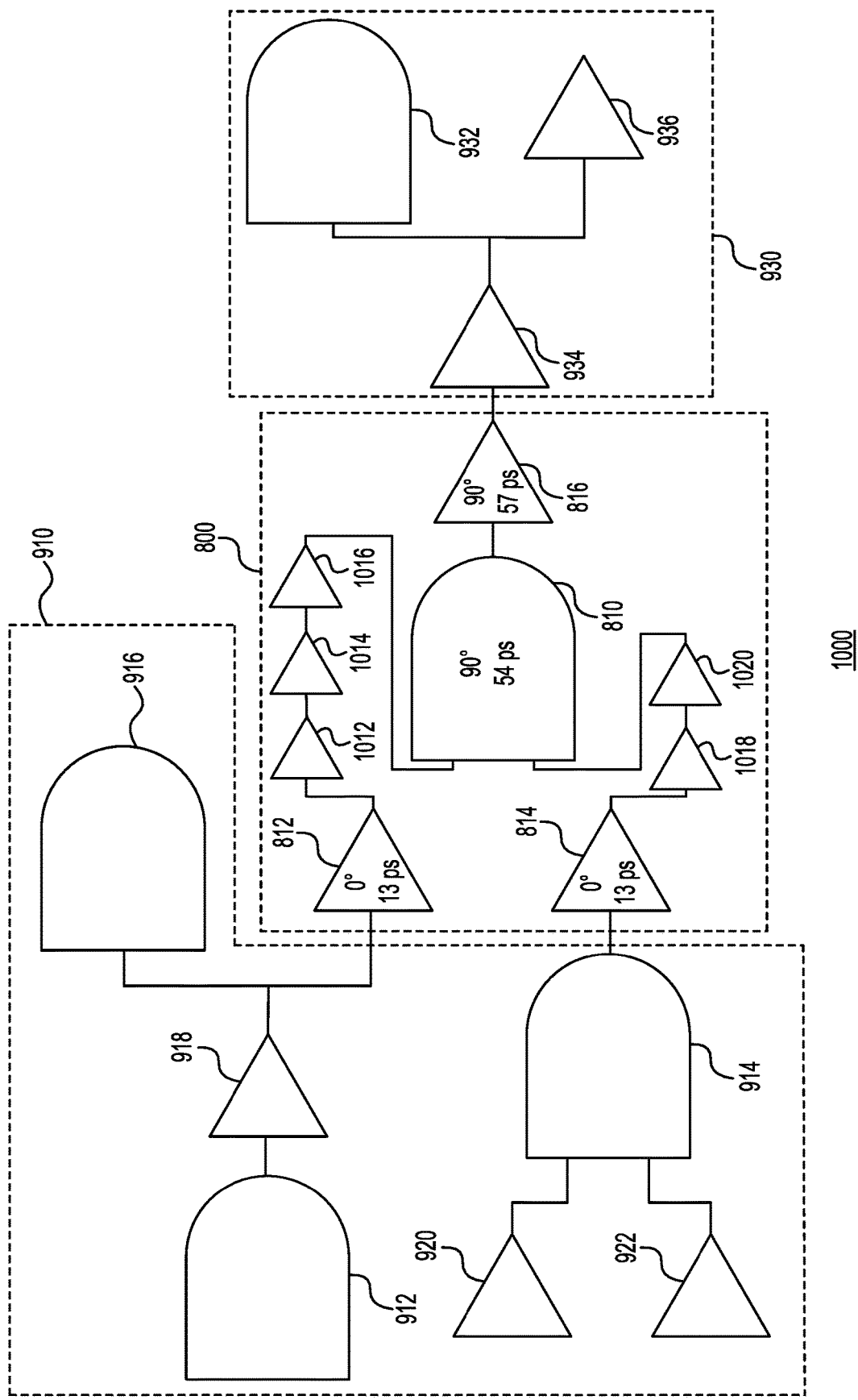
FIG. 10 is a diagram showing the addition of active transmission elements to the TCG of FIG. 8.

FIG. 10 is a diagram 1000 showing the addition of active transmission elements to TCG 800. As shown in FIG. 10, TCG 800 is subjected to an initial solve step using the critical path and the phase assignments (this step corresponds to step 1 of the algorithm in Table 12). In this example, this step involves performing steps 1-4 shown in Table 11 with respect to the timing pins associated with gate 810 of TCG 800. The result of performing these steps is the addition of active transmission elements (e.g., JTLs 1012, 1014, and 1016) between buffer 812 and one of the inputs of gate 810. In addition, JTLs 1018 and 1020 are added between buffer 814 and the other input of gate 810. The phase assignment of gate 810 is also changed from 0 degrees to 90 degrees. Similarly, the phase assignment of buffer 816 is changed from 0 degrees to 90 degrees. In addition, the first legal start time for the 90 degrees phase for buffer 816 is computed as 57 picoseconds (ps). In this example, the changes in the timing/phase information for TCG 800 and the insertion of additional JTLs necessitates changes in the timing information of the other timing constraint groups that are affected by these changes.

Figure 11:
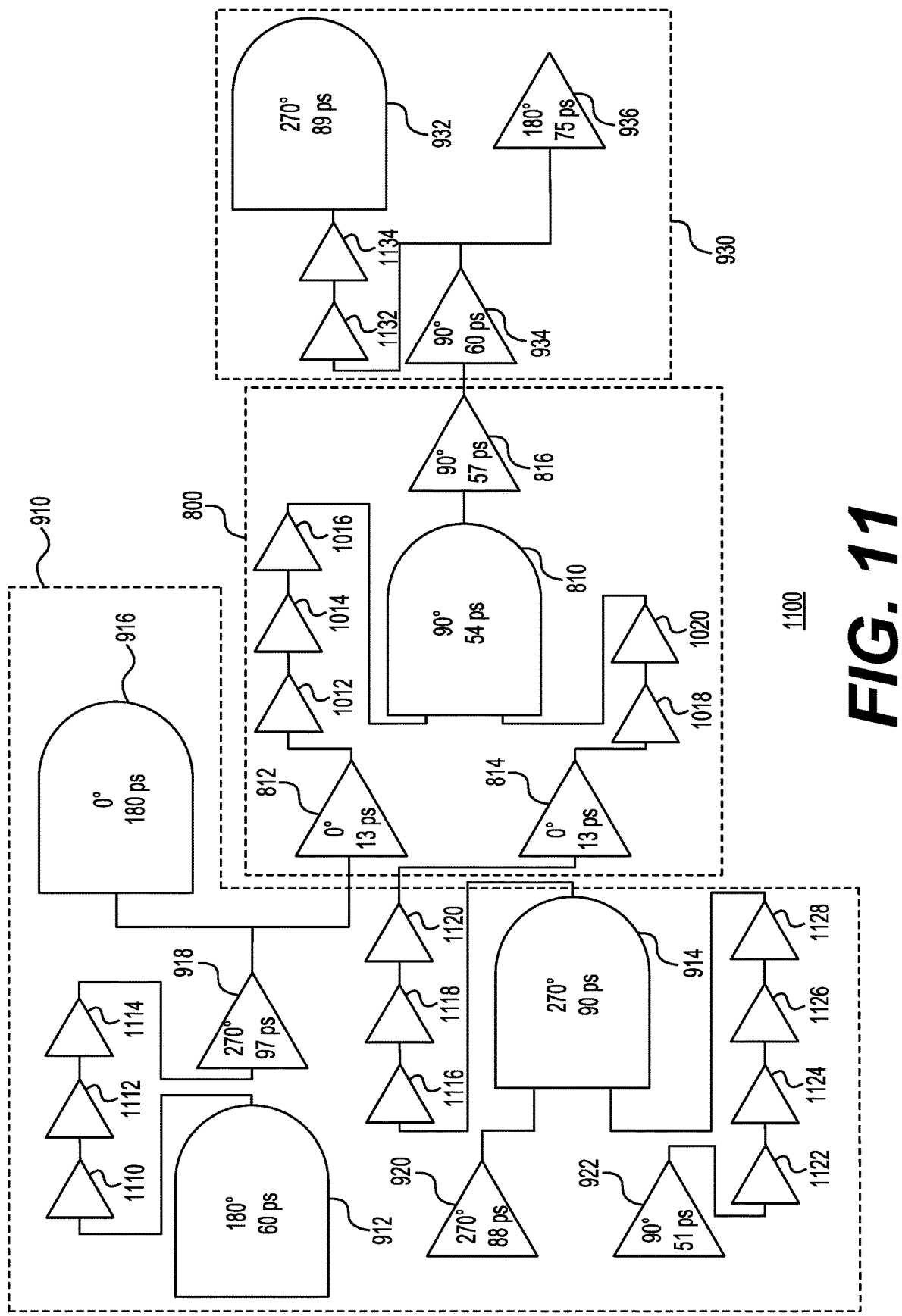
FIG. 11 is a diagram showing timing information and phase assignments and extra JTLs (as needed) filled in for the other timing constraint groups.

FIG. 11 is a diagram 1100 showing timing information and phase assignments and extra JTLs (as needed) filled in for the other timing constraint groups. Thus, in this example, TCG 910 is shown as including extra JTLs 1110, 1112, and 1114 that are added between gate 912 and buffer 918. In addition, gate 912 has been assigned a legal start time of 60 ps and a phase of 180 degrees. Buffer 918 has been assigned a legal start time of 97 ps and a phase of 270 degrees. Gate 916 has been assigned a legal start time of 108 ps and a phase of 0 degrees. Moreover, TCG 910 includes extra JTLs 1116, 1118, and 1120 that have been added between gate 914 and an input to buffer 814 of TCG 800. Gate 914 has been assigned a legal start time of 90 ps. Extra JTLs 1122, 1124, 1126, and 1128 have been added between the output of buffer 922 and one of the sink pins of gate 914. Buffer 920 has been assigned a legal start time of 88 ps and a phase of 270 degrees and buffer 922 has been assigned a legal start time of 51 ps and a phase of 90 degrees.

With continued reference to FIG. 11, TCG 930 is shown with extra JTLs 1132 and 1134. Gate 932 has been assigned a legal start time of 89 ps and a phase of 270 degrees. Buffer 934 has been assigned a legal start time of 60 ps and a phase of 90 degrees. Buffer 936 has been assigned a legal start time of 75 ps and a phase of 180 degrees. For TCG 930, the timing and phase assignments may be determined in a similar fashion as for TCG 800.

Figure 12:
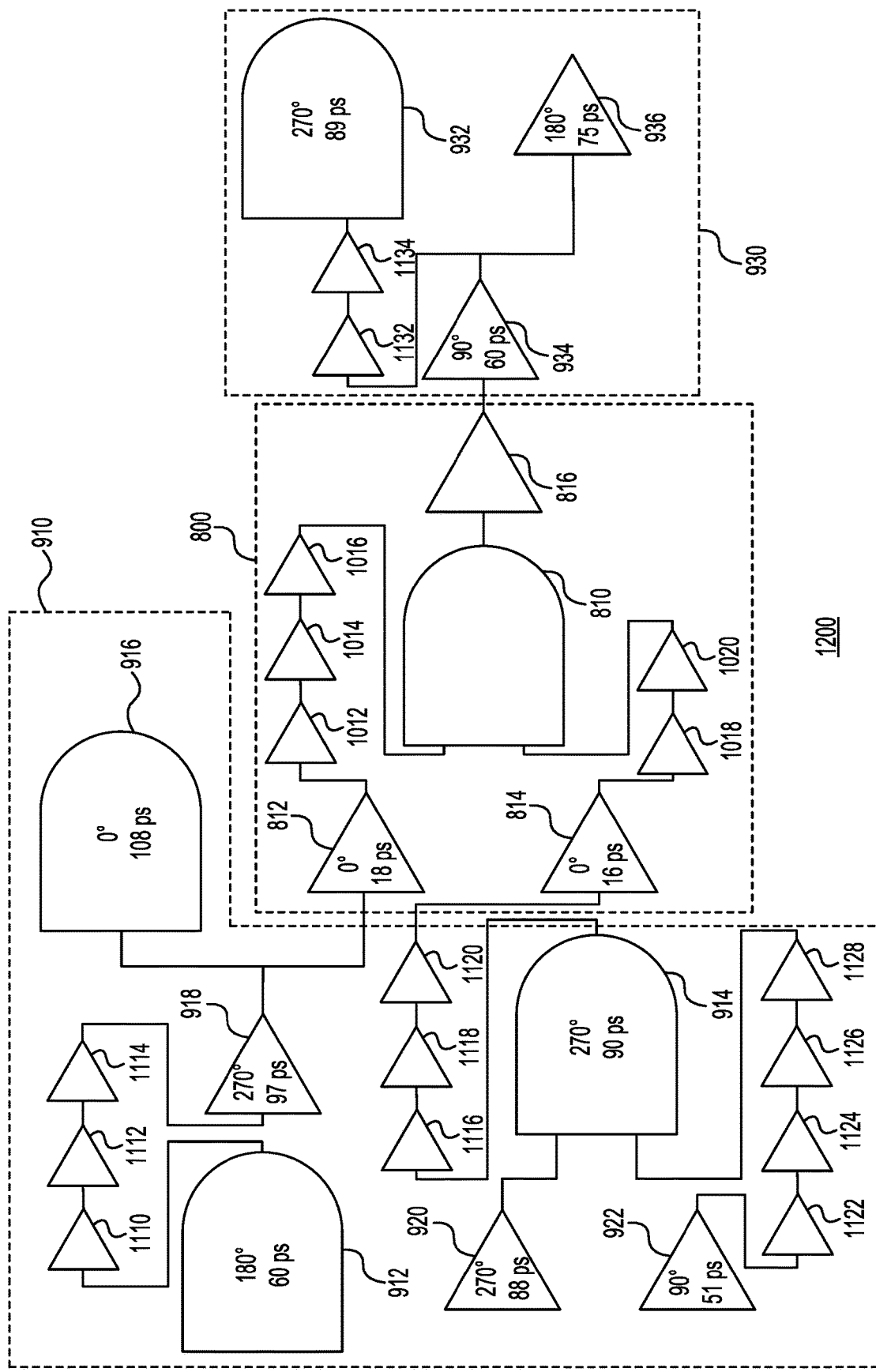
FIG. 12 is a diagram showing changes in timing of the heads for the TCG of FIG. 8 in accordance with one example.

FIG. 12 is a diagram 1200 showing changes in timing of the heads for TCG 800 in accordance with one example. Thus, in this example, the legal start time for buffer 812 has been changed from 13 ps to 18 ps and the legal start time for buffer 814 has been changed from 13 ps to 16 ps. These timing changes may be determined as part of the reconcile step (e.g., step 3 of the algorithm in Table 12). Next, the timing and phase information associated with the remaining components: gate 810 and buffer 816 in TCG 800 is cleared. Next, TCG 800 is subjected to the solve step again.

Figure 13:
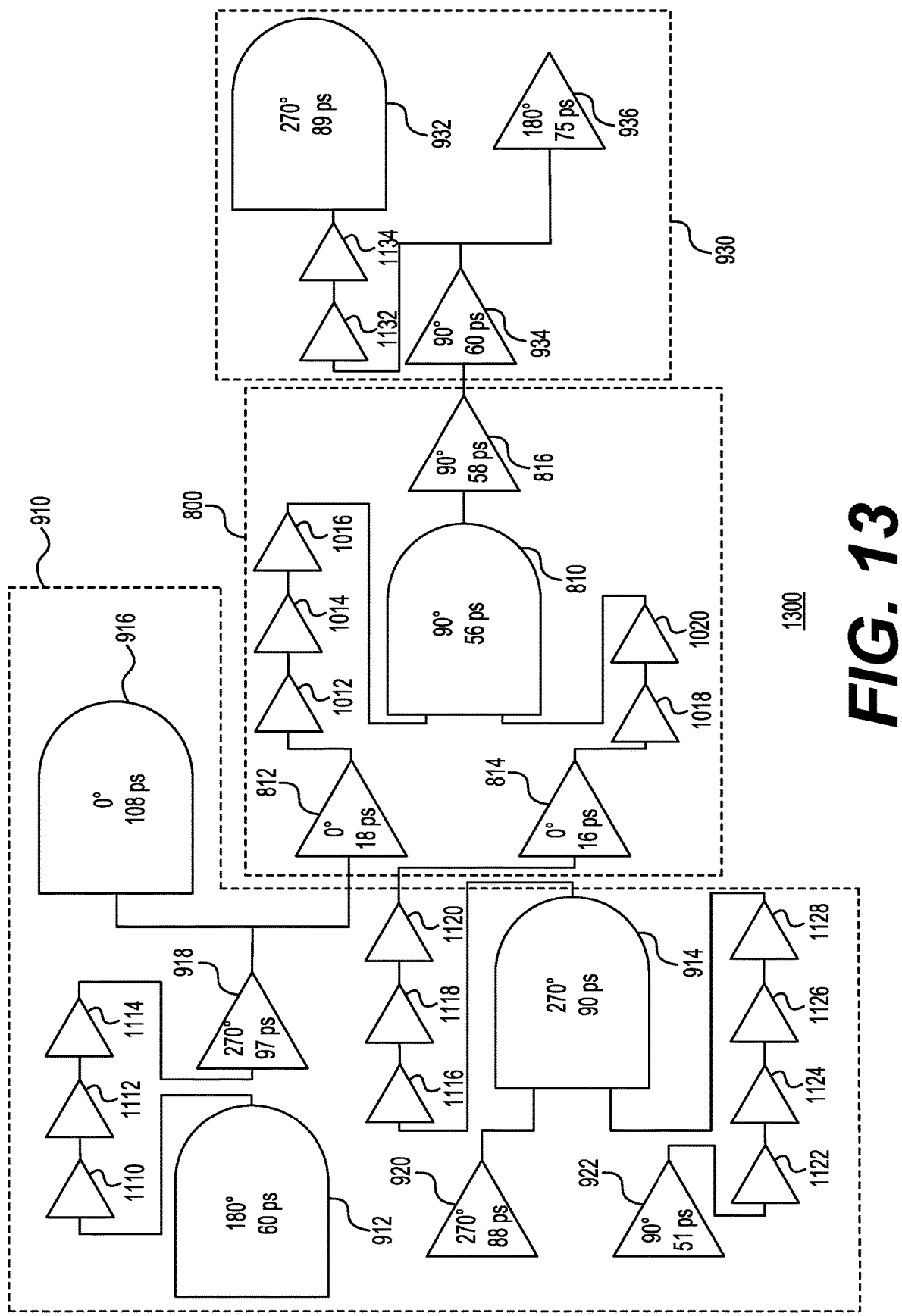
FIG. 13 is a diagram showing changes in the timing of the remaining components for the TCG of FIG. 8 as a result of the solve step in accordance with one example.

FIG. 13 is a diagram 1300 showing changes in the timing of the remaining components for TCG 800 as a result of the solve step in accordance with one example. In this example, the legal start time of gate 810 changes from 54 ps to 56 ps and the legal start time of buffer 816 changes from 57 ps to 58 ps. Although the solve step results in no changes to the phase assignments of gate 810 and buffer 816, they could have changed, if needed. Next, the timing and phase assignments associated with the shadow components in the other TCGs are updated.

Figure 14:
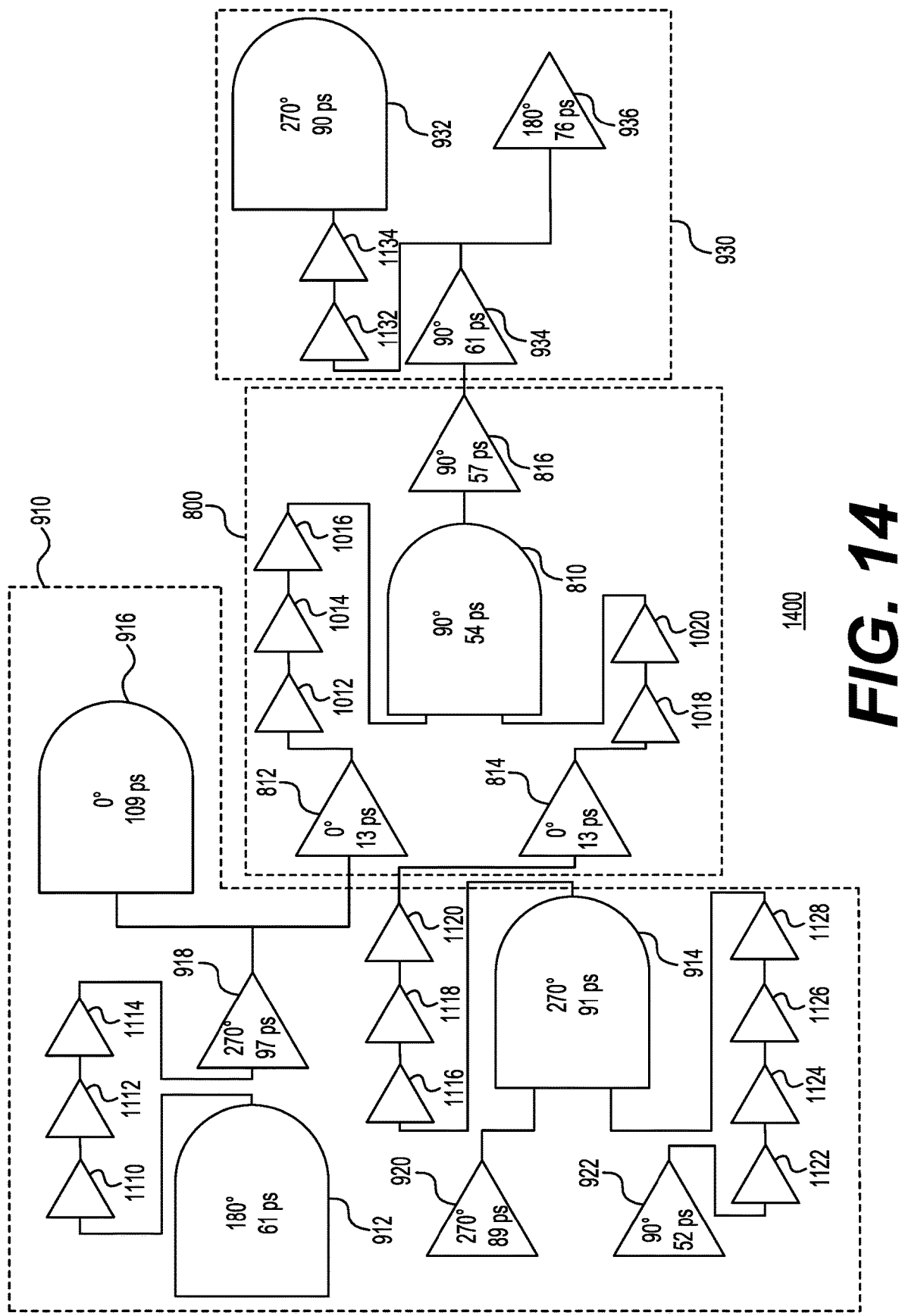
FIG. 14 is a diagram showing changes in the timing of the other TCGs in accordance with one example.

FIG. 14 is a diagram 1400 showing changes in the timing of the other TCGs (e.g., TCG 910 and TCG 930) in accordance with one example. In this example, this step is performed as part of the application of the algorithm described with respect to Table 12 to update the timing and phase assignments of the shadow components. In this example, legal start time of gate 912 is changed from 60 ps to 61 ps; the legal start time of gate 914 is changed from 90 ps to 91 ps; and the legal start time of gate 916 is changed from 108 ps to 109 ps. The legal start time of buffer 918 is, for now, unchanged (97 ps); the legal start time of buffer 920 is changed from 88 ps to 89 ps; and the legal start time of buffer 922 is changed from 51 ps to 52 ps. With respect to TCG 930, the legal start time of gate 932 is changed from 89 ps to 90 ps. The legal start time of buffer 934 is changes from 60 ps to 61 ps and the legal start time of buffer 936 is changed from 75 ps to 76 ps. The steps involving the reconciling steps may be repeated until there are no timing and phase assignment related conflicts. As an example, a subsequent reconciling step may keep all of the timings the same, except that the legal start time associated with buffer 918 is changed from 97 ps to 98 ps. Thus, in this example, FIGS. 8-14 show the application of the algorithm shown in Table 12 to find a convergent solution where the iterations of the algorithm lead to the timing and the phase assignments being fixed and no longer requiring changes.

Figure 15:
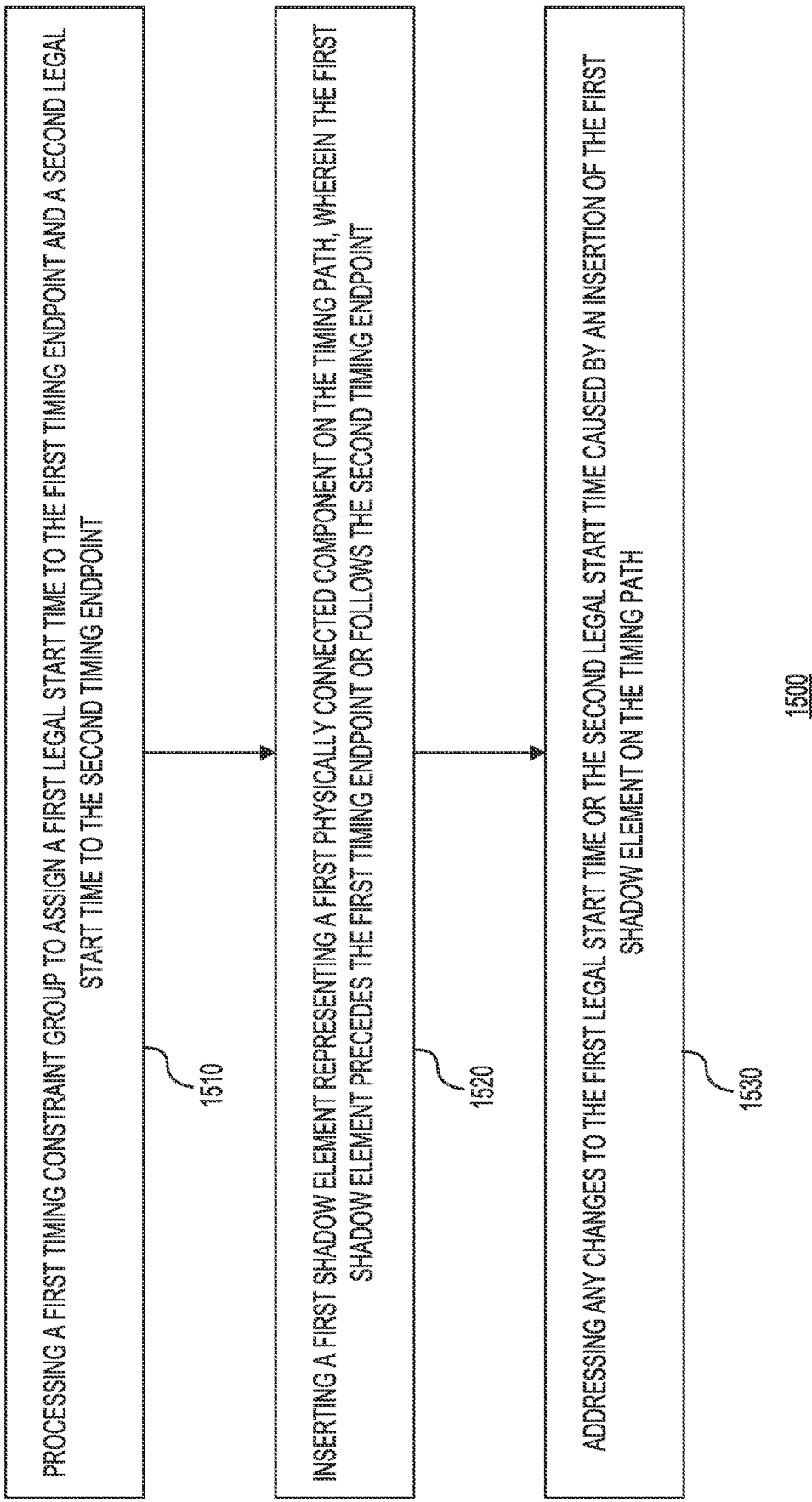
FIG. 15 is a flowchart of a method for determining timing paths and reconciling topology in a superconducting circuit design in accordance with one example.

FIG. 15 is a flowchart 1500 of a method for determining timing paths and reconciling topology in a superconducting circuit design in accordance with one example. In this example, the superconducting circuit design may include a first timing path including a first set of timing pins, and a first subset of the first set of timing pins may be associated with a first timing constraint group including a first timing endpoint and a second timing endpoint. Step 1510 may include processing the first timing constraint group to assign a first legal start time to the first timing endpoint and a second legal start time to the second timing endpoint. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform step 1 of the algorithm described with respect to Table 12. As an example, this step may include using the critical timing path algorithm described earlier, the legal start time(s) for each of the timing endpoints may be determined.

Step 1520 may include inserting a first shadow element representing a first physically connected component on the timing path, where the first shadow element precedes the first timing endpoint or follows the second timing endpoint. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform this step in a similar manner as described with respect to FIG. 9. Thus, timing engine 132 may process the timing design in view of the timing constraints imposed by other circuits in the design. In one example, as part of this analysis, components (referred to as shadow elements or shadow components) that are within a depth of three timing endpoints may be included. The legal start times for these endpoints and the phase assignments for the gates or buffers includes as part of the shadow elements may be obtained in a similar fashion as described earlier.

Step 1530 may include addressing any changes to the first legal start time or the second legal start time caused by an insertion of the first shadow element on the timing path. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform steps 2 and 3 described in Table 12. As an example, these steps are described with the help of the example timing constraint group 800 of FIG. 8 with respect to FIGS. 10-14. Although FIG. 15 shows a certain number of steps being performed in a certain order, the method may include more or fewer steps performed in a different order.

Figure 16:
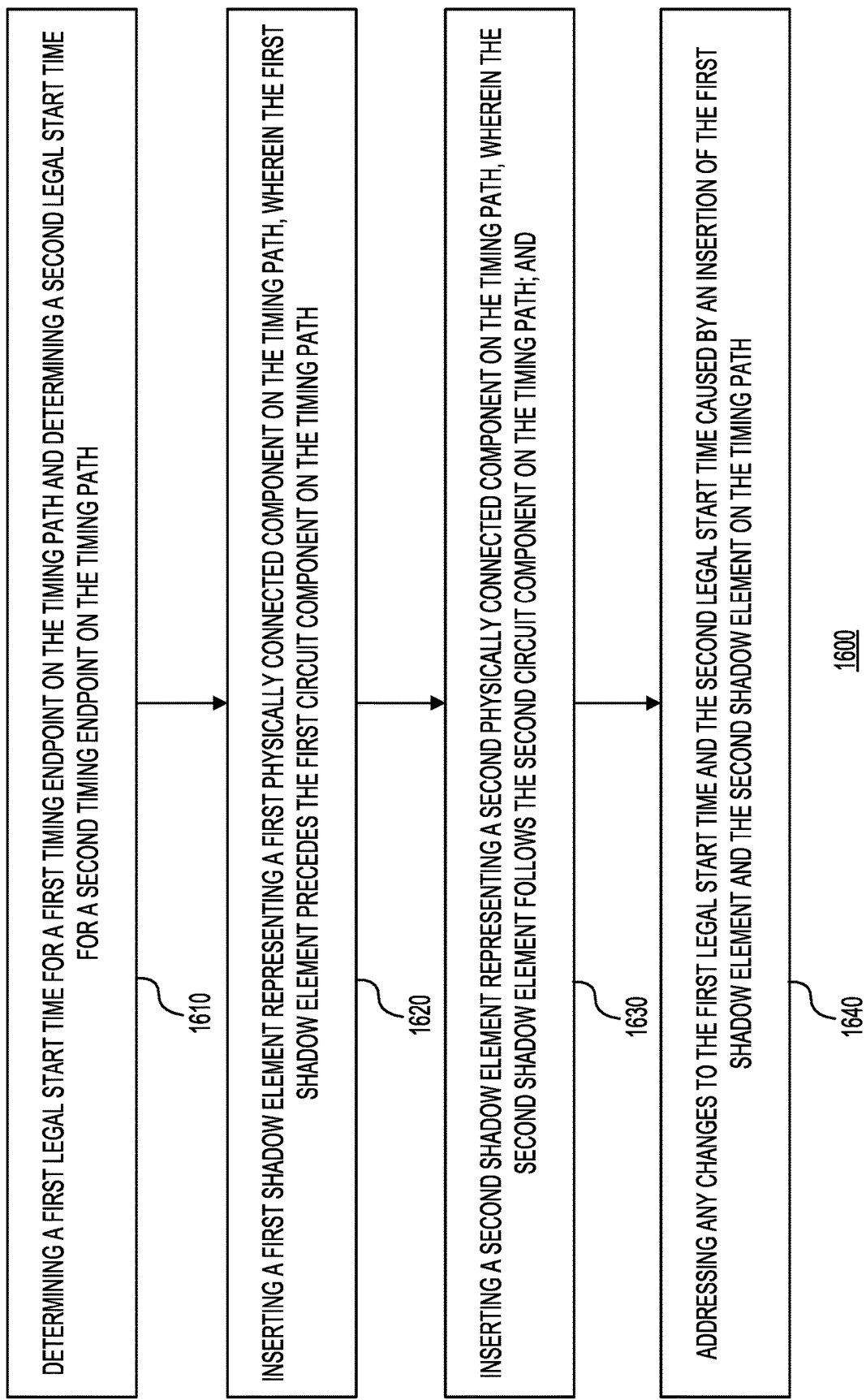
FIG. 16 is a flowchart of a method for determining timing paths and reconciling topology in a superconducting circuit design in accordance with one example.

FIG. 16 is a flowchart 1600 of a method for determining timing paths and reconciling topology in a superconducting circuit design in accordance with one example. In this example, superconducting circuit design may comprise a first timing path including a first timing endpoint associated with a first circuit component and a second timing endpoint associated with a second circuit component, and where each of the first circuit component and the second circuit component comprises Josephson junctions. The first circuit component is assigned a first phase and the second circuit component is assigned a second phase. Step 1610 may include using the processor, determining a first legal start time for the first timing endpoint on the timing path and determining a second legal start time for the second timing endpoint on the timing path. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform step 1 of the algorithm described with respect to Table 12. As an example, this step may include using the critical timing path algorithm described earlier, the legal start time(s) for each of the timing endpoints may be determined.

Step 1620 may include inserting a first shadow element representing a first physically connected component on the timing path, where the first shadow element precedes the first circuit component on the timing path. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform this step in a similar manner as described with respect to FIG. 9. Thus, timing engine 132 may process the timing design in view of the timing constraints imposed by other circuits in the design. In one example, as part of this analysis, components (referred to as shadow elements or shadow components) that are within a depth of three timing endpoints may be included. As part of step 1620, the first shadow element may be part of a timing constraint group that precedes the first circuit component on the timing path. Thus, in this example, the first shadow element may be gate 914 of FIG. 9. The legal start times for these endpoints and the phase assignments for the gates or buffers includes as part of the shadow elements may be obtained in a similar fashion as described earlier.

Step 1630 may include inserting a second shadow element representing a second physically connected component on the timing path, where the second shadow element follows the second circuit component on the timing path. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform this step in a similar manner as described with respect to FIG. 9. Thus, timing engine 132 may process the timing design in view of the timing constraints imposed by other circuits in the design. In one example, as part of this analysis components (referred to as shadow elements or shadow components) that are within a depth of three timing endpoints may be included. As part of step 1630, the second shadow element may be part of a timing constraint group that follows the second circuit component on the timing path. Thus, in this example, the second shadow element may be gate 934 of FIG. 9. The legal start times for these endpoints and the phase assignments for the gates or buffers includes as part of the shadow elements may be obtained in a similar fashion as described earlier.

Step 1640 may include addressing any changes to the first legal start time and the second legal start time caused by an insertion of the first shadow element and the second shadow element on the timing path. In this example, this step may be performed by timing engine 132, when code/algorithms related to timing engine 132 (e.g., code or algorithms stored in memory 406 of FIG. 4) are executed by a processor (e.g. processor(s) 402 of FIG. 4). In this example, timing engine 132 may perform steps 2 and 3 described in Table 12. As an example, these steps are described with the help of the example timing constraint group 800 of FIG. 8 with respect to FIGS. 10-14. Although FIG. 16 shows a certain number of steps being performed in a certain order, the method may include more or fewer steps performed in a different order.

In conclusion, the present disclosure relates to a method, implemented by a processor, for determining a critical timing path in a superconducting circuit design, where the superconducting circuit design comprises at least one logic gate including at least one Josephson junction, and where the at least one logic gate has an assigned first phase associated with a clock signal for clocking the at least one logic gate. The method may include providing timing information concerning a plurality of source terminals of the at least one logic gate coupled with a first sink terminal of the at least one logic gate. The method may further include using the processor, determining whether, in view of the timing information, the first sink terminal is reachable by a single flux quantum (SFQ) pulse within a predetermined range of arrival time based on the assigned first phase to the at least one logic gate.

The method may further include, if the first sink terminal is not reachable by the SFQ pulse within the predetermined range of arrival time, inserting a Josephson transmission line (JTL) element between at least one of the plurality of source terminals and the first sink terminal. The method may further include determining whether the first sink terminal is reachable by the SFQ pulse within the predetermined range of arrival time after an insertion of the JTL element. The method may further include upon determining that the first sink terminal is reachable by the SFQ pulse, after the insertion of the JTL element, within the predetermined range of arrival time, removing the first sink terminal from among a plurality of sink terminals associated with the at least one logic gate, as being associated with the critical timing path.

The method may further include selecting the first sink terminal based on a predetermined behavior from among a plurality of sink terminals associated with the at least one logic gate. The selecting the first sink terminal based on the predetermined behavior may comprise selecting a sink terminal as the first sink terminal having a minimum of maximum rise time values of respective SFQ pulses associated with the plurality of sink terminals.

The method may include, prior to the determining step, assigning a second phase to the at least one logic gate by adding a phase offset to the first phase. The timing information may be provided via a timing library comprising at least timing constraints and allowed signal types, where the allowed signal types are selected from a group comprising a wave pipelined logic type of signals or a phase mode logic type of signals.

In another aspect, the present disclosure relates to a method, implemented by a processor, for determining a critical timing path in a superconducting circuit design, where the superconducting circuit design comprises a plurality of logic gates, and where each of the plurality of logic gates comprises at least one Josephson junction. The method may include providing timing information concerning a plurality of source terminals associated with the plurality of logic gates. The method may further include receiving a selection of a first sink terminal from among a plurality of sink terminals associated with a target logic gate selected from among the plurality of logic gates. The method may further include receiving an assignment of a phase to the target logic gate. The method may further include for each of the plurality of sink terminals: using the processor, determining whether each of the plurality of sink terminals is reachable by a respective single flux quantum (SFQ) pulse within a predetermined range of arrival time, and if the first sink terminal is not reachable within the predetermined range of arrival time, then inserting a Josephson transmission line (JTL) between a source terminal associated with the target logic gate and the first sink terminal determined to be unreachable within the predetermined range of arrival time, and upon determining that the first sink terminal is reachable, after an insertion of the JTL, within the predetermined range of arrival time, removing the first sink terminal from among the plurality of sink terminals as being associated with the critical timing path.

The method may further include selecting the first sink terminal based on a predetermined behavior from among the plurality of sink terminals associated with the target logic gate. The selecting the first sink terminal based on the predetermined behavior may comprise selecting a sink terminal as the first sink terminal having a minimum of maximum rise time values of respective SFQ pulses associated with the plurality of sink terminals.

The method may further include, prior to the determining step, assigning a second phase to the target logic gate by adding a phase offset to the first phase. The timing information may be provided via a timing library comprising at least timing constraints and allowed signal types, where the allowed signal types is selected from a group comprising a wave pipelined logic type of signals or a phase mode logic type of signals.

In yet another aspect, the present disclosure relates to a system configured to determine a critical timing path in a superconducting circuit design, where the superconducting circuit design comprises at least one logic gate including at least one Josephson junction, and where the at least one logic gate has an assigned first phase associated with a clock signal for clocking the at least one logic gate. The system may include a first sub-system configured to provide timing information concerning a plurality of source terminals of the at least one logic gate coupled with a first sink terminal of the at least one logic gate. The system may further include a second sub-system, including a processor, configured to determine whether, in view of the timing information, the first sink terminal is reachable by a single flux quantum (SFQ) pulse within a predetermined range of arrival time based on the assigned first phase to the at least one logic gate.

The system may further be configured to, if the first sink terminal is not reachable by the SFQ pulse within the predetermined range of arrival time, allow an insertion of a Josephson transmission line (JTL) element between at least one of the plurality of source terminals and the first sink terminal. The system may further be configured to determine whether the first sink terminal is reachable by the SFQ pulse within the predetermined range of arrival time after an insertion of the JTL element. The system may further be configured to, upon determining that the first sink terminal is reachable by the SFQ pulse, after the insertion of the JTL element, within the predetermined range of arrival time, remove the first sink terminal from among a plurality of sink terminals associated with the at least one logic gate as being associated with the critical timing path. The system may further be configured to select a sink terminal as the first sink terminal having a minimum of maximum rise time values of respective SFQ pulses associated with the plurality of sink terminals.

The system may further be configured to assign a second phase to the at least one logic gate by adding a phase offset to the first phase. The system may further comprise a timing library including at least timing constraints and allowed signal types, where the allowed signal types are selected from a group comprising a wave pipelined logic type of signals or a phase mode logic type of signals.

In another aspect, the present disclosure relates to a method, implemented by a processor, for determining timing paths and reconciling topology in a superconducting circuit design, where the superconducting circuit design comprises a first timing path including a first set of timing pins, and where a first subset of the first set of timing pins is associated with a first timing constraint group including a first timing endpoint and a second timing endpoint. The method may include using the processor, processing the first timing constraint group to assign a first legal start time to the first timing endpoint and a second legal start time to the second timing endpoint. The method may further include inserting a first shadow element representing a first physically connected component on the timing path, where the first shadow element precedes the first timing endpoint or follows the second timing endpoint. The method may further include addressing any changes to the first legal start time or the second legal start time caused by an insertion of the first shadow element on the timing path.

In the method, the processing the first timing constraint group to assign the first legal start time to the first timing endpoint may comprise determining whether the first timing endpoint is reachable by a single flux quantum (SFQ) pulse within a first range of arrival time, and where processing the first timing constraint group to assign the second legal start time to the second timing endpoint comprises determining whether the second timing endpoint is reachable by the SFQ pulse within a second range of arrival time. The method may further include, if the second timing endpoint is not reachable by the SFQ pulse within the second range of arrival time, inserting a Josephson transmission line (JTL) element between the first timing endpoint and the second timing endpoint.

The timing path may comprise a second timing constraint group and a third timing constraint group, and where the second timing constraint group comprises a third timing endpoint and a fourth timing endpoint and the third timing constraint group comprises a fifth timing endpoint and a sixth timing endpoint, and where the method further comprises processing the second timing constraint group to assign a third legal start time to the third timing endpoint and a fourth legal start time to the fourth timing endpoint and processing the third timing constraint group to assign a fifth legal start time to the fifth timing endpoint and a sixth legal start time to the sixth endpoint.

The method may further include inserting a second shadow element representing a second physically connected component on the timing path, where the second shadow element precedes the first timing endpoint or follows the second timing endpoint. The addressing any changes to the first legal start time or the second legal start time may comprise modifying the first legal start time to generate a first modified legal start time or modifying the second legal start time to generate a second modified legal start time.

The method may further include addressing any changes to the first modified legal start time or the second modified legal start time caused by an insertion of the second shadow element on the timing path. The timing information concerning the timing path may be provided via a timing library comprising at least timing constraints and allowed signal types, where the allowed signal types are selected from a group comprising a wave pipelined logic type of signals or a phase mode logic type of signals.

In yet another aspect, the present disclosure relates to a method, implemented by a processor, for determining timing paths and reconciling topology in a superconducting circuit design, where the superconducting circuit design comprises a first timing path including a first timing endpoint associated with a first circuit component and a second timing endpoint associated with a second circuit component, and where each of the first circuit component and the second circuit component comprises Josephson junctions, and where the first circuit component is assigned a first phase and the second circuit component is assigned a second phase. The method may include using the processor, determining a first legal start time for the first timing endpoint on the timing path and determining a second legal start time for the second timing endpoint on the timing path. The method may further include inserting a first shadow element representing a first physically connected component on the timing path, where the first shadow element precedes the first circuit component on the timing path. The method may further include inserting a second shadow element representing a second physically connected component on the timing path, where the second shadow element follows the second circuit component on the timing path. The method may further include addressing any changes to the first legal start time and the second legal start time caused by an insertion of the first shadow element and the second shadow element on the timing path.

The determining the first legal start time for the first timing endpoint may comprise determining whether the first timing endpoint is reachable by a single flux quantum (SFQ) pulse within a first range of arrival time, and where the determining the second legal start time to the second timing endpoint comprises determining whether the second timing endpoint is reachable by the SFQ pulse within a second range of arrival time. The method may further include, if the second timing endpoint is not reachable by the SFQ pulse within the second range of arrival time, inserting a Josephson transmission line (JTL) element between the first circuit component and the second circuit component and assigning a phase to the JTL. The addressing any changes to the first legal start time or the second legal start time may comprise modifying the first legal start time to generate a first modified legal start time or modifying the second legal start time to generate a second modified legal start time.

The method may further include addressing any changes to the first modified legal start time or the second modified legal start time caused by an insertion of the second shadow element on the timing path. The timing information concerning the timing path may be provided via a timing library comprising at least timing constraints and allowed signal types, where the allowed signal types are selected from a group comprising a wave pipelined logic type of signals or a phase mode logic type of signals.

In yet another aspect, the present disclosure relates to a system configured to determine timing paths and reconcile topology in a superconducting circuit design, where the superconducting circuit design comprises a first timing path including a first timing endpoint associated with a first circuit component and a second timing endpoint associated with a second circuit component, and where each of the first circuit component and the second circuit component comprises Josephson junctions, and where the first circuit component is assigned a first phase and the second circuit component is assigned a second phase. The system may include a processor and a memory comprising instructions. The instructions may be configured to: (1) determine a first legal start time for the first timing endpoint on the timing path and determine a second legal start time for the second timing endpoint on the timing path, (2) insert a first shadow element representing a first physically connected component on the timing path, where the first shadow element precedes the first circuit component on the timing path, (3) insert a second shadow element representing a second physically connected component on the timing path, where the second shadow element follows the second circuit component on the timing path, and (4) address any changes to the first legal start time and the second legal start time caused by an insertion of the first shadow element and the second shadow element on the timing path.

The first shadow element may be coupled to the first circuit component via a first active transmission element and the second circuit component may be coupled to the second shadow element via a second active transmission element. The first active transmission element may comprise a first Josephson transmission line (JTL) and the second active transmission element may comprise a second JTL.

The first active transmission element may be assigned a third phase and the second active transmission element may be assigned a fourth phase. Each of the first phase, the second phase, the third phase, and the fourth phase may be selected from a group consisting of 0 degrees phase, 90 degrees phase, 180 degrees phase, and 270 degrees phase. The system may further include a timing library including timing information concerning the timing path, where the timing information comprises at least timing constraints and allowed signal types, where the allowed signal types are selected from a group comprising a wave pipelined logic type of signals or a phase mode logic type of signals.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as DRAM, SRAM, a cache, or other such media. Non-transitory media is distinct from, but can be used in conjunction with, transmission media. Transmission media is used for transferring data and/or instruction to or from a machine, such as processor(s) 402. Example transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by a processor, for determining a critical timing path in a superconducting circuit design, wherein the superconducting circuit design comprises a plurality of logic gates, and wherein each of the plurality of logic gates comprises at least one Josephson junction, the method comprising:
   receiving a selection of a first sink terminal having a minimum of a maximum rise time values for single flux quantum (SFQ) pulses from among a plurality of sink terminals associated with a target logic gate selected from among the plurality of logic gates;
   receiving an assignment of a phase to the target logic gate;
   if the first sink terminal is not reachable within a predetermined range of arrival time, then inserting a first Josephson transmission line (JTL) between a source terminal associated with the target logic gate and the first sink terminal;
   upon determining that the first sink terminal is reachable, after an insertion of the first JTL, within the predetermined range of arrival time, removing the first sink terminal from among the plurality of sink terminals as being associated with the critical timing path; and
   upon determining that the first sink terminal is not reachable, even after an insertion of the first JTL, within the predetermined range of arrival time, inserting a second JTL between the source terminal associated with the target logic gate and the first sink terminal.

2. The method of claim 1, further comprising, after inserting the first JTL, assigning a first phase to the first JTL.

3. The method of claim 2, further comprising, after inserting the second JTL, assigning a second phase to the second JTL.

4. The method of claim 1, further comprising, the processor looking up a table to determine the minimum of the maximum rise time values.

5. The method of claim 1, further comprising, providing timing information concerning a plurality of source terminals associated with the plurality of logic gates.

6. The method of claim 5, wherein the timing information is provided via a timing library comprising at least timing constraints and allowed signal types.

7. The method of claim 6, wherein the allowed signal types is selected from a group comprising a wave pipelined logic type of signals or a phase mode logic type of signals.

8. A system comprising:
a processor; and
a memory having instructions, when executed by the processor, configured to:
receive a selection of a first sink terminal having a minimum of a maximum rise time values for single flux quantum (SFQ) pulses from among a plurality of sink terminals associated with a target logic gate selected from among a plurality of logic gates associated with a superconducting circuit design,
receive an assignment of a phase to the target logic gate,
if the first sink terminal is not reachable within a predetermined range of arrival time, then insert a first Josephson transmission line (JTL) between a source terminal associated with the target logic gate and the first sink terminal,
upon determining that the first sink terminal is reachable, after an insertion of the first JTL, within the predetermined range of arrival time, remove the first sink terminal from among the plurality of sink terminals as being associated with a critical timing path, and
upon determining that the first sink terminal is not reachable, even after an insertion of the first JTL, within the predetermined range of arrival time, insert a second JTL between the source terminal associated with the target logic gate and the first sink terminal.

9. The system of claim 8, wherein the instructions are further configured to, after inserting the first JTL, assign a first phase to the first JTL.

10. The system of claim 9, wherein the instructions are further configured to, after inserting the second JTL, assign a second phase to the second JTL.

11. The system of claim 8, wherein the memory further comprises a table including maximum rise time values, and wherein the instructions are further configured to look up the table to determine the minimum of the maximum rise time values.

12. The system of claim 8, wherein the memory further comprises timing information concerning a plurality of source terminals associated with the plurality of logic gates.

13. The system of claim 12, wherein the timing information is stored in a timing library comprising at least timing constraints and allowed signal types.

14. The system of claim 12, wherein the allowed signal types is selected from a group comprising a wave pipelined logic type of signals or a phase mode logic type of signals.

15. A non-transitory computer readable medium comprising instructions for a method for determining a critical timing path in a superconducting circuit design, wherein the superconducting circuit design comprises a plurality of logic gates, and wherein each of the plurality of logic gates comprises at least one Josephson junction, the method comprising;
receiving a selection of a first sink terminal having a minimum of a maximum rise time values for single flux quantum (SFQ) pulses from among a plurality of sink terminals associated with a target logic gate selected from among the plurality of logic gates;
receiving an assignment of a phase to the target logic gate;
if the first sink terminal is not reachable within a predetermined range of arrival time, then inserting a first Josephson transmission line (JTL) between a source terminal associated with the target logic gate and the first sink terminal;
upon determining that the first sink terminal is reachable, after an insertion of the first JTL, within the predetermined range of arrival time, removing the first sink terminal from among the plurality of sink terminals as being associated with the critical timing path; and
upon determining that the first sink terminal is not reachable, even after an insertion of the first JTL, within the predetermined range of arrival time, inserting a second JTL between the source terminal associated with the target logic gate and the first sink terminal.

16. The non-transitory computer readable medium of claim 15, wherein the method further comprising, after inserting the first JTL, assigning a first phase to the first JTL.

17. The non-transitory computer readable medium of claim 16, wherein the method further comprising, after inserting the second JTL, assigning a second phase to the second JTL.

18. The non-transitory computer readable medium of claim 15, wherein the method further comprising, providing timing information concerning a plurality of source terminals associated with the plurality of logic gates.

19. The non-transitory computer readable medium of claim 18, wherein the timing information is provided via a timing library comprising at least timing constraints and allowed signal types.

20. The non-transitory computer readable medium of claim 19, wherein the allowed signal types is selected from a group comprising a wave pipelined logic type of signals or a phase mode logic type of signals.

* * * * *